United States Patent [19]
Yang

[11] Patent Number: 5,379,393
[45] Date of Patent: Jan. 3, 1995

[54] CACHE MEMORY SYSTEM FOR VECTOR PROCESSING

[75] Inventor: Qing Yang, Wakefield, R.I.

[73] Assignee: The Board of Governors for Higher Education, State of Rhode Island and Providence Plantations, Providence, R.I.

[21] Appl. No.: 882,857

[22] Filed: May 14, 1992

[51] Int. Cl.$^6$ .................... G06F 12/02; G06F 12/16
[52] U.S. Cl. .................... 395/400; 395/425; 364/243.41; 364/253; 364/255.1; 364/255.3; 364/256.3; 364/256.8; 364/DIG. 1
[58] Field of Search .................... 395/400, 425

[56] References Cited

U.S. PATENT DOCUMENTS

| | | | |
|---|---|---|---|
| 4,638,431 | 1/1987 | Nishimura | 395/425 |
| 4,888,679 | 12/1989 | Fossum et al. | 395/425 |
| 4,958,274 | 9/1990 | Dutton et al. | 395/425 |
| 5,063,497 | 11/1991 | Cutler et al. | 395/800 |
| 5,133,059 | 7/1992 | Ziegler et al. | 395/425 |
| 5,134,695 | 7/1992 | Ikeda | 395/400 |

OTHER PUBLICATIONS

Bailey, David H., "Vector Computer Memory Bank Contention", *IEEE Transactions on Computers*, vol. C-36, No. 3, Mar. 1987, pp. 293-298.

Budnik, Paul and David J. Kuck, "The Organization and Use of Parallel Memories", *IEEE Transactions on Computers*, Dec. 1971, pp. 1566-1569.

Fu, John W. C., and Janak H. Patel, "Data Prefetching in Multiprocessor Vector Cache Memories", *Center for Reliable and High-Performance Computing*, University of Illinois at Urbana-Champaign, 1991, pp. 54-63.

Gannon, Dennis, William Jalby, and Kyle Gallivan, "Strategies for Cache and Local Memory Management by Global Program Transformation", *International Conference on Supercomputing*, 1987, pp. 229-254.

Harper, III, David T., "Block, Multistride Vector, and FFT Accesses in Parallel Memory System", *IEEE Transactions on Parallel and Distribution Systems*, vol. 2, No. 1, Jan. 1991, pp. 43-51.

Hill, Mark D., "A Case for Direct-Mapped Caches", *IEEE Computer*, Dec. 1988, pp. 25-40.

Lam, Monica S., Edward E. Rothberg, and Michael E. Wolf, "The Cache Performance and Optimizations of Blocked Algorithms", 4th *International Conference on ASPLOS*, 1991, pp. 63-74.

Lawrie, Duncan H. and Chandra R. Vora, "The Prime Memory System for Array Access", *IEEE Transactions on Computers*, vol. C-31, No. 5, May 1982, pp. 435-442.

Oed, Wilfred, and Otto Lange, "On the Effective Bandwidth of Interleaved Memories in Vector Processor Systems", *IEEE Transactions on Computers*, vol. C-34, No. 10, Oct. 1985, pp. 949-957.

Raghavan, Ram and John P. Hayes, "On Randomly Inerleaved Memories", *Proceedings of Supercoputing*, 1990, pp. 49-57.

Smith, Alan Jay, "Cache Memories", *Computing Surveys*, vol. 14, No. 3, Sep. 1982, pp. 473-523.

So, Kimming, and Vittorio Zecca, "Cache Performance (List continued on next page.)

*Primary Examiner*—Joseph L. Dixon
*Assistant Examiner*—Michael A. Whitfield
*Attorney, Agent, or Firm*—Samuels, Gauthier & Stevens

[57] ABSTRACT

A cache memory system for use during vector processing in a processor. The processor contains a central processing unit (CPU) and a main memory. The system includes a vector cache memory, a first address register, a main memory address calculation unit, and a cache address calculation unit. The first register stores a first address associated with an instruction executed by the CPU. The main memory address calculation unit is coupled to the first address register for calculating a second address utilizing the first address and vector stride data associated with said executed instruction. The second address is utilized to access the main memory. The cache address calculation unit is coupled to both the first address register and the main memory address calculation unit for calculating the third address utilizing portions of the first address and portions of the second address. The third address is utilized to access the vector cache memory.

14 Claims, 11 Drawing Sheets

OTHER PUBLICATIONS of Vector Processors", *International Symposium on Computer Architecture*, 1988, pp. 261–268.

Yang, Qing, Laxmi N. Bhuyan, and Bao-Chyn Liu, "Analysis and Comparison of Cache Coherence Protocols for a Packet-Switched Multiprocessor", *IEEE Transactions on Computers*, vol. 38, No. 8, Aug. 1989, pp. 1143–1153.

Dongarra, J. et al., "A Set of Level 3 Basic Linear Algebra Subprograms", *ACM Transactions on Mathematics Software*, vol. 16-1, Mar. 1990, pp. 1–17.

Abu-Sufah, W., and A. D. Malony, "Vector Processing on the ALLIANT FX/8 Microprocessor", *International Conference on Parallel Processing*, Aug. 1986, pp. 559–566.

Bandarkar, D. and R. Brunner, "VAX Vector Architecture", *Proc. 17th International Symposium on Computer Architecture*, 1990, pp. 204–215.

Hennessy, J. L. and D. A. Patterson, *Computer Architecture, A Quantitative Approach*, Morgan Kaufmann, 1990.

Stone, H. S., *High Performance Computer Architecture*, Addison-Wesley, 1990.

Pettofrezzo, A. J., and D. R. Byrkit, *Elements of Number Theory*, Prentice-Hall, 1970.

Cooley, J. W., *The Structure of FFT and Convolution Algorithms*, Research Report, IBM T. J. Watson Research Center, 1990.

CACHE MEMORY SYSTEM FOR VECTOR PROCESSING

This invention was made with government support under grant number CCR-8909672, awarded by the National Science Foundation.

BACKGROUND OF THE INVENTION

The invention relates to information processors involving cache memory systems, and specifically to cache memory systems for use in vector processing. The research for this invention was supported, in part, by National Science Foundation Grant No. CCR-8909672.

Cache memories have been successfully used to improve the system performance of general purpose computers (see A. J. Smith, "Cache memories," *Computing Surveys*, vol 14, pp. 472-530, September 1982). Such general purpose computers typically involve scalar processors which, although capable of processing vector data, do so in a relatively time consuming fashion.

The processing of vector data (vector processing) can be more efficiently performed with the use of certain kinds of processors (called vector processors) which are designed to more efficiently process vectors. The overall operational speed of vector processors is limited, however, in part, by the time required to locate and move vector data to and from main memory. Although cache systems have been used in connection with vector processors, such systems are not efficient and typically do not increase the operating efficiency of the vector processor system. This is because present cache systems are not designed to efficiently cooperate with vector processors.

Current vector processors typically do not have cache memories because of resulting decreases in vector processing performance. These decreases in performance are due primarily to three factors. First, numerical programs generally have data sets that are too large for the present cache sizes. Vector data accesses of a large vector may result in complete reloading of the cache before the processor reuses the data. Second, address sequentiality is typically required by conventional caches. However, vectorized numerical algorithms usually access data at certain unit or nonunit intervals (referred to in the art as strides). Third, register files and highly interleaved memories have been commonly used to achieve high memory bandwidth required by vector processing. Cache memories may not significantly improve the performance of such systems. Due to the rapid advances in device technology and increased gap between processor speeds and memory speeds (see J. L. Hennessy and D. A. Patterson, *Computer Architecture, A Quantitative Approach*, Morgan Kaufmann, 1990), it has become increasingly important to study the performance of cache memories for vector processors (see H. S. Stone, *High Performance Computer Architecture*, Addison-Wesley, 1990).

Concern regarding poor performance of cache memories for processors due to the size of data sets has been studied by a number of researchers (see M. S. Lam, E. E. Rothberg, and M. E. Wolf, "The cache performance and optimizations of blocked algorithms," *Proc. of Arch, Supp. for Prog. Lang. and Opr. Sys.*, pp. 63-74, April 1991; K. So and V. Zecca, "Cache performance of vector processors," *Proc. 15th. Int'l Symp. on Comp. Arch.*, pp. 261-268, 1988; and D. Gannon, W. Jalby, and K. Gallivan, "Strategies for cache and local memory management by global program transformation," *Int'l Conf. on Supercomputing*, 1987). It is known that the memory hierarchy can be better utilized if numerical algorithms are blocked. Regarding the performance of cache memories in vector processors (vector caches) the vector data can be blocked into several segments and computations can be performed on the segments, instead of operating on an entire vector of a large size. Blocking is a general program optimization technique that promotes data reuse in high speed memories. It has been shown that blocking is effective for many algorithms in linear algebra (see J. Dongarra et al., "A set of level 3 basic linear algebra subprograms," *ACM Transactions on Mathematics Software*, vol. 16-1, pp. 1-17, March 1990).

The cache performance of a blocked matrix multiplication algorithm has been studied and it has been found that the blocking factor (the size of "inner loop") has a significant impact on cache performance (see Lam et al. supra). Performance studies have also been done for vector caches by means of trace driven simulations showing that although the program locality of vector executions is significantly different from that of scalar executions the cache hit ratio can be high enough to take advantage of having a cache (see So et al. supra). These studies are based on traces of sets of fixed size programs which are either cache-optimized subroutines from the machine library or are highly vectorized for vector machines. Such a cache may not, however, be as efficient for generally blocked programs with different problem sizes.

Sequentiality of vector addresses depends on vector access stride which varies widely in numerical algorithms. Since the basic storage unit in a cache is a cache line which consists of a group of consecutive memory words, cache pollution may result if the access stride is not one. Large cache lines may exploit the spatial locality of vector accesses with small strides but may lead to poor cache performance for large strides. Small cache lines, on the other hand, may increase the number of cache misses depending on the vector stride.

A comprehensive study has been presented on the effects of cache line sizes on the performance of vector caches (see J. W. C. Fu and J. H. Patel, "Data prefetching in multiprocessor vector cache memories," *Proc. 18th. Int'l Symp. on Comp. Arch.*, pp. 54-63, 1991). The study proposes two prefetching schemes, sequential-prefetching and stride-prefetching, for vector caches to reduce the influence of long stride vector accesses. Certain performance improvements as a result of the two prefetching schemes were obtained. However, the cache miss ratios for some applications considered were still as high as over 40% in some cases. This is due, in part, to the fact that not only does the poor sequentiality of vector data result in cache pollution but it also results in a large amount of interference misses.

Conventional supercomputer vector machines use interleaved memory and large register files to increase memory access speeds. However, due to the increasing technological gap between processor speeds and memory speeds there is a need to increase memory speeds by involving a cache memory system in such supercomputer vector machines. A cache memory system is needed because not only is a register file relatively small as compared with the working set of a program but a register file system also requires the software programmer to make extra steps to manage the data. Cache memory, on the other hand, is transparent to programmers. Highly interleaved memory may provide enough bandwidth to single stream vector accesses, but the memory speed has to be extremely fast and the number of interleaved memory modules has to be very large in order to provide enough bandwidth for multiple stream vector accesses. It has been shown that hundreds and even thousands of interleaved memory modules are needed to achieve a reasonable memory performance for multiple stream vector accesses (see D. H. Bailey, "Vector computer memory bank contention," *IEEE Trans. on Computers*, vol. C-36, pp. 293-298, March 1987). Furthermore, vector processing has become a mainstream form of computing ranging from superminis to workstations. Vector processors have also been incorporated into mainframes as built-in accelerators for computation - intensive applications. For these types of machines, a cache memory can be a cost-effective enhancement towards a smooth memory hierarchy (see So et al. supra; Fu et al. supra; and W. Abu-Sufah and A. D. Malony, "Vector processing on the ALLIANT FX/8microprocessor," *Int. Conf. on Parallel Processing*, pp. 559-566, August 1986). Several vector computers feature a cache-based memory hierarchy such as IBM 3090 (see So et al. supra), Alliant FX/8 (see Abu et al. supra) and Vax/600 (see D. Bandarkar and R. Brunner, "VAX Vector architecture," *Proc. 17th. Int'l Symp. on Comp. Arch.*, pp. 204-215, 1990).

Although cache memories have potential for improving the performance of future vector processors, there are practical reasons why such systems have not yet been satisfactorily efficient. A single miss in the vector cache results in a number of processor stall cycles equal to the entire memory access time, while the memory accesses of a vector processor without cache are fully pipelined. In order to benefit from a vector cache, the miss ratio must be kept extremely small. In general, cache misses can be classified into three categories (see Hennessy et al. supra): compulsory, capacity, and conflicts. The compulsory misses are the misses in the initial loading of data which can be properly pipelined in a vector computer. The capacity misses are due to the size limitations of a cache on holding data between references. If application algorithms are properly blocked as discussed above, the capacity misses can be attributed to the compulsory misses for the initial loading of each block of data provided that the block size is less than the cache size. The last category, conflict misses, plays a key role in the vector processing environment. Conflicts can occur when two or more elements of the same vector are mapped to the same cache line or elements from two different vectors compete for the same cache line. The former is called "self-interference" whereas the latter is called "cross-interference" (see Lam et al. supra). A study on blocked matrix multiplication algorithms shows that the self-interference misses increase drastically and dominate cache misses after the fraction of a 16K-word cache being used exceeds 3% (see Lam et al. supra). It is also shown that an algorithm with one problem size can run at twice the speed of the same algorithm with a different size.

Since conflict misses that significantly degrade vector cache performance are related to vector access stride, it may be desirable to adjust the size of an application problem to provide a beneficial access stride for a given machine. However, not only does this approach give a programmer a burden of knowing architecture details of a machine but such an approach is also not practical for many applications. It is known that the number of conflicts is minimized if the stride of accessing a vector is relative prime to the number of cache lines (or sets for set-associative cache) which is a power of 2 for direct or set-associative cache. Note that the stride required to access the major diagonal of a matrix is one greater than the stride required to access a row of the matrix stored in a column-major. Therefore, it is not possible to make both row access and major diagonal access efficient because one stride or the other is not relative prime to the cache size of any direct or set-associative cache.

It is therefore an object of the present invention to provide a cache memory system suitable for use in vector processing and in particular for use with vector processors.

It is a further object of the present invention to provide a vector cache memory indexing system capable of efficiently cooperating with numerical programs having data sets of various sizes and various access strides.

SUMMARY OF THE INVENTION

The invention relates to a new cache system, referred to as prime-mapped cache, which is designed, in part, to minimize cache miss ratio in vector processing (with scalar or vector processors). A primary feature of the design is that memory data are mapped into cache lines according to a Mersenne prime. The cache access logic of the mapping scheme operates in virtually the same time period as direct-mapped cache, resulting in no additional delay for cache accesses. The address generation for the cache takes no longer than the normal address calculation time for main memory due to the special properties of the Mersenne number as utilized in the present invention. The generation of addresses for cache access is done in parallel with normal address calculations resulting in no performance penalty. Thus, it has the advantages of both direct-mapped cache and fully associative cache if replacement is not considered.

The cache design of the invention for vector computers is called prime-mapped cache. The system does not increase the critical path length of a processor, nor does it increase the cache access time as compared to a direct-mapped cache. The prime-mapped cache minimizes cache miss ratio caused by line interferences that have been shown to be critical for numerical applications by previous investigators. Significant performance gains are possible by adding the proposed cache memory into an existing vector computer provided that application programs can be blocked. The performance gain increases as processor speeds increase.

The utility of the system of the present invention is expressed with an analytical presentation of two vector processor models: a memory-register vector processor model and a cache-based vector processor model. The advantage of analytical modeling is that it provides a quick and insightful performance estimate of a given design without the limitation of application problem sizes. Based on the analytical model, one can easily pinpoint potential performance problems. Moreover, most numerical algorithms are highly structured, which makes analysis possible and fairly accurate. The performance analysis on several typical vector access patterns shows that the new cache design improves vector processing performance by a factor of 2-3 over conventional cache designs with a negligible amount of additional hardware cost. For vector accesses in which random multistrides are used to access two vector streams, the performance improvement of the prime-mapped cache over direct-mapped cache ranges from 40% to a factor of 3 (300%). By properly selecting blocking factors, subblock (or submatrix) accesses can easily be made conflict free even if the cache utilization is close to 1 for matrices of arbitrary sizes. For Fast Fourier Transform (FFT) access patterns, the performance optimization is guaranteed as long as the blocking factor is less than the cache size.

The caching behavior of 3 typical block algorithms for numerical application have been analyzed: matrix multiplication, Gaussian elimination (LU decomposition) and FFT. Numerical results that are averaged over all problem sizes show that vector computers with a prime-mapped cache outperform both the vector computer without cache and the vector computer with a direct-mapped cache for all three algorithms. The performance improvement goes up to a factor of 3.4 for matrix multiplication, a factor of 5.5 for Gaussian elimination which is the core of Linpack benchmark, and 70% for cache optimized FFT.

DETAILED DESCRIPTION OF THE INVENTION

Figure 1:
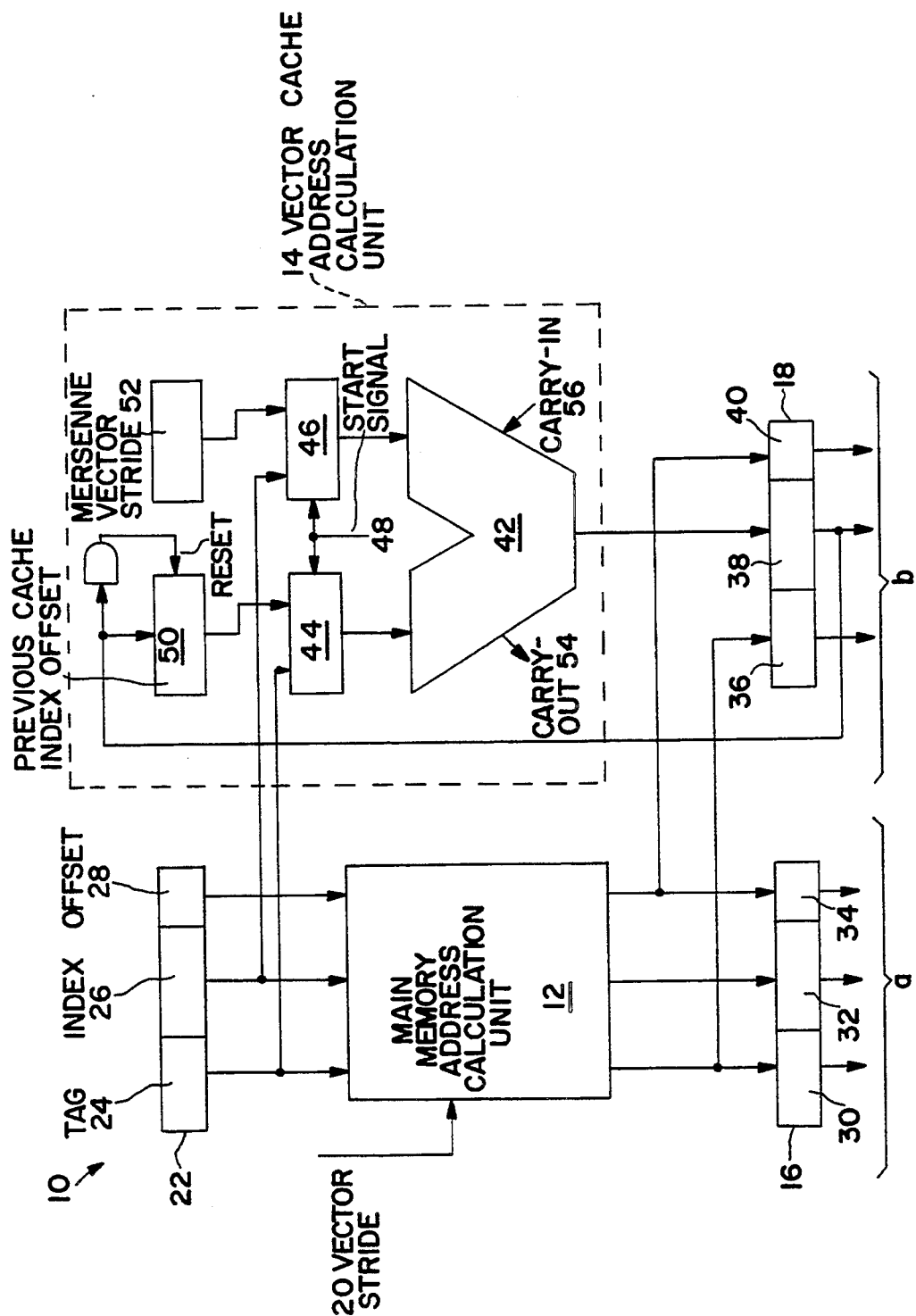
FIG. 1 shows a block diagram of an embodiment of the address generator logic of the system of the invention.

The present invention provides a vector cache memory indexing system designed to overcome the drawbacks of present cache memory systems. The system of the invention is particularly useful for vector processing within vector processors. The term "vector cache" refers to a cache which holds vector data accessed by vector load or store instructions. It is assumed that scalar data have a separate cache (see Bandarkar et al. supra).

The new mapping scheme minimizes interference misses of the vector cache. Since cache misses in a vector cache result mainly from line conflicts as discussed above, one might consider set-associative-mapped cache with higher associativity or fully associative cache. It is known that higher associativity has the advantages of less line conflicts and the flexibility of implementing a replacement algorithm such as (LRU). It has been shown that the average miss rates of a set-associative cache are relatively lower than that of direct-mapped cache (see Lam et al. supra). However, the fraction of cache used in case of set-associative cache still remains very small (in the range of 20% to 60%) though it is larger than that of the direct-mapped cache. Moreover, the standard deviation increases steadily with the blocking factor implying that the execution time for some problem sizes can be significantly worse than others. For the same cache size, increasing associativity results in a decreased number of sets to which data can be mapped (although several cache lines can be mapped to the same set). As a result, a significant reduction in terms of interference misses will not be seen. Furthermore, increasing the associativity also increases the cache hit time which has negative effects on system performance (see M. D. Hill, "A case for direct-mapped caches," *IEEE Computer*, pp. 25–40, December 1988). As for the replacement algorithm, due to the nature of numerical algorithms, it may not be possible to take advantage of this as can be done for other applications since serial access to vectors dictates against LRU replacement (see Stone supra).

Cache line size is one of the most important parameters in a cache design. Larger cache line sizes reduce compulsory misses if an application has a high spatial locality. However, larger cache lines also reduce the number of lines in the cache, giving rise to more conflicts. In addition, non-unit access strides may also result in cache pollution since the loaded excess data may never be used before being replaced. Cache pollution degrades cache performance significantly because not only do the unused data use cache space but also memory bandwidth (see Fu et al. supra). It has been observed that cache line sizes have unpredictable impacts on vector cache performance (see Fu et al. supra). The best cache line size of one program may be the worst for another program in a given cache design. For some applications, increasing cache line sizes even results in increased miss ratio. It has been suggested that an optimal cache line size for vector processing is difficult to determine unless all application programs have the same stride characteristics (see Fu et al. supra). There are also other considerations in deciding cache line size such as bus width, degree of memory interleaving etc. Cache line size selection for the vector cache is more complicated than for general purpose computers. It is preferred that the line size be fixed at 8 bytes or one double precision word.

The performance gain resulting from adding a conventional cache memory is not significant. Not only is the performance improvement as compared to the system without cache limited, but it also makes the programmer's job difficult because the programmer has to know the hardware details in order to determine the optimal blocking factors for various applications. Moreover, the cache utilization is extremely poor.

The present invention provides a cache design with a mapping scheme called 'prime-mapping' which minimizes interference misses. The cache is generally designed as follows. Instead of having $2^c$ cache lines in the cache, only a prime number of cache lines is allowed to reside in the cache. The use of a prime number of cache lines in a memory system to avoid memory access conflicts has been attempted (see P. Budnik and D. J. Kuck, "Organization and use of parallel memories," *IEEE Trans. on Computers*, pp. 1566–1569, December 1971). The use of a prime number of memory modules in the context of a parallel computer has been suggested (see Budnik et al. supra). The idea was latter developed by Burroughs in the design of the BSP computer (see D. H. Lawrie and C. R. Vora, "The prime memory system for array access," *IEEE Trans. on Computers*, vol. C-31, pp. 435–441, May 1982). However, addressing for such prime-number memory systems is much more complex than for memory systems in which the number of memory modules is a power of 2. This complicated addressing is more critical in cache design since additional delays for cache accesses cannot be afforded. Any increase in cache hit time will affect not only the average access time but also the clock rate of the CPU. Therefore, it is of essential importance that any attempt to design a new cache system must ensure no increase in the length of the critical path of a processor.

The approach of the present invention is to utilize the special properties of a class of prime numbers: the Mersenne primes. A Mersenne number is of the form $2^c - 1$ for some c that makes $2^c - 1$ a prime number. Examples of c are 2, 3, 5, 7, 13, 17, and 19 etc.. A cache line with address $A_L$ is mapped into line number $A_L$ mod $(2^c - 1)$ in the cache. Since a Mersenne number is a prime, a vector access to the cache with this mapping scheme can be made conflict-free. Meanwhile, the address space is also well utilized since the number of lines in the prime-mapped cache is just one less than a 2's power.

A detailed description of the prime-mapped scheme follows. Each memory address is partitioned into three fields, as is conventional in cache-based computer systems (see Hill supra): $W = \log_2$ (line size) bits of word address in a line (offset); $c = \log_2$ (number of lines $+1$) bits of index; and the remaining tag bits of tag. The access logic of the prime-mapped cache consists of three components: data memory, tag memory, and matching logic. Similar to direct-mapped cache, the data memory contains an address decoder and cached data; the tag memory stores tags corresponding to the cached lines; and the matching logic checks if the tag in an issued address matched the tag in the cache. The cache lookup process is exactly the same as the direct-mapped cache and hence takes the same amount of time as the direct-mapped cache. However, the index field used to access the data memory is not just a subfield of the original address word issued by the processor since the modulus for cache mapping is not a 2's power any more. It is the residue of the line address modulo a Mersenne number. The efficiency of this modular operation is essential to cache performance. The index conversion can be done without adding additional delay in the address mapping process.

FIG. 1 shows a block diagram of the address computation logic 10. It consists of two parts (a) and (b) which function in parallel. Part (a) includes a main memory address calculation unit 12 which generates addresses for accessing the main memory and vector cache address calculation unit 14 which generates addresses for accessing the vector cache. The address for accessing the main memory is called the memory address 16 and the address for accessing the vector cache is called the cache address 18. The main memory address calculation unit 12 is a part of the address control logic or functional unit within conventional vector computers. The memory address 16 of a vector element is calculated based on a vector stride 20 and the previous address 22 of the previous element of the vector.

The previous address 22 includes three fields (a tag field 24, an index field 26, and a word offset field 28). The memory address 16 includes tag field 30, index field 32, and word offset field 34. The cache address 18 includes tag field 36, index field 38, and word offset field 40. The tag field 30 and the word offset field 34 are the same as the tag field 36 and the word offset field 40 respectively.

The vector cache address calculation unit 14 includes c-bit full adder 42, index multiplexor 44, and stride multiplexor 46. Index multiplexor 44 communicates with adder 42 responsive to tag 24, vector start signal 48, and previous cache index offset 50. Stride multiplexor 46 communicates with adder 42 responsive to index field 26, vector start signal 48, and the vector stride in Mersenne number form 52.

The index field 38 (c bits) is calculated in a Mersenne number form through the vector cache address calculation unit 14. Since a Mersenne number is defined as an integer modulo $2c - 1$ arithmetic operations are greatly simplified by noting that $2c = 1$. Consider any two integers represented in c-bit binary form. Adding the two numbers results in a (c+1)-bit sum with the most significant bit being carry-out bit 54. But $2^c \equiv 1$ mod $(2^c - 1)$. Thus, addition modulo a Mersenne number is performed very simply by using a conventional full binary adder of c bits 42 and by folding the most significant carry-out bit 54 back into the least significant carry-in bit 56. Therefore, a c-bit full adder 42 is sufficient to perform the address generation. The index field 38 of the cache address 18 of a vector element is obtained by adding the stride to the index field of the cache address of the previous element of the vector. Note that both the stride and the previous index value should be in the Mersenne number form for reasons explained hereinafter. Because the addition is performed on a c-bit field which is a portion of a memory word, this process should take no longer than the main memory address calculation process. Two addresses are therefore generated concurrently: one for cache access and the other for memory access in case of a cache miss.

The cache address 18 of the first element of a vector and the vector stride in Mersenne number form 52 are generated as follows. Let the starting line address of a vector be $A_{start}$ which consists of two fields: $tag_A$ and $index_A$ with the lengths of each field being tag and c, respectively. The offset field of an address is ignored because a line is the basic unit for cache mapping. If the least significant c bits of $tag_A$ are represented by $tag_{A1}$ and the second c bits are represented by $tag_{A2}$ and so forth, then in order to map the starting line of the vector into the prime-mapped cache, the modular operation $A_{start}$ mod $(2^c-1)$ must be performed. Since $$A_{start} = index_A + 2^c tag_{A1} + 2^{2c} tag_{A2} + \ldots$$

and $$2^c \bmod (2^c-1) = 1,$$

$$A_{start} \bmod (2^c-1) = index_A + tag_{A1} + tag_{A2} + \ldots$$

Therefore, to derive the index field of the starting line address of a vector, one must perform a sequence of c bit additions. If the length of $tag_A$ (tag) in bits is less than or comparable to the length of $index_A$ (c), then only one c-bit addition is needed. This is often the case in practice. For example, the cache size of the Alliant FX/8 is 128K bytes (16K double words) (see Abu et al. supra) gives rise to an index length of 14 bits if the line size is 8 bytes. If the address length is 32 bits, then the remaining tag field consists of maximum of 15 bits. One then needs to perform a 14-bit addition and add back the most significant bit (32th bit from left) of the starting address into the least significant bit of the sum. Similarly, the VAX6000 Model 400 vector processor has a cache of 1 Mbytes that can easily make the tag field comparable to the index field. If it is desired in a design that the tag field be longer than the index field, at most one more levels of addition of c bits is needed in calculating the index field of the starting address of a vector.

In the present embodiment the address conversion logic 10 for the starting element of a vector assumes that tag ≦ c. The two multiplexors 44 and 46 are used to select addends for the c-bit adder. The multiplexors 44 and 46 select two fields (tag 24 and index 26 respectively) of the previous memory address word 22 and addition if the vector start signal is activated (i.e., it is a starting element). For all other elements of the vector, the multiplexors 44 and 46 will select the index value of the cache address of the previous element and the stride respectively for the addition.

The generation of the vector starting address for cache access can be done in parallel with the memory access of the vector element if the vector is accessed in the first instance. It may be assumed that a couple of stages of c bit additions may finish before the loaded memory data arrives in the vector cache. Thus, the loaded data can be written into the vector cache using the newly calculated index value. In this case, there is no performance penalty resulting from the address conversion. The converted cache address of the starting element can be stored in a special register for future reuses if the vector is going to be accessed again. Subsequent accesses to the elements in the same vector can be done using two possible addresses: cache addresses as discussed above or memory addresses if a miss occurs. The calculation of these addresses does not incur any additional delay compared to existing machines as evidenced previously.

Converting an integer stride into a Mersenne number can be done in the same way as for the starting address, i.e., only additions are needed. This process can be done at the time when the vector stride is loaded into the vector stride register. However, a special register of c bits is needed to keep the converted stride 52 as shown in FIG. 1. The additional hardware cost of this new mapping scheme includes 2 multiplexors, a full adder and a few registers as shown in FIG. 1. Even a small percentage of performance improvement can justify such insignificant hardware cost. As discussed hereinafter the performance of machines utilizing cache mapped in accordance with the invention is twice or three times that of the machines without cache.

However, there is still a trade-off between performance and hardware cost. The registers storing the starting addresses of vectors, for example, add more cost to the machine. If several vectors are accessed concurrently, not only are more registers needed but the control logic to control the access of these registers is also needed. If 1 or more cycles can be afforded at each vector start-up time, these registers may be eliminated. Each time a vector is accessed again, its starting address is recalculated even though the vector is already in the cache. This recalculation requires only an addition of subwords which takes a small amount of time, and may also be pipelined. In alternative embodiments, if performance is critically important one can pay for the registers.

An analytical model is presented for evaluating the performance of the system of the present invention. The model is based on a known vector performance model (see Hennessey supra). It should be noted that the analysis and the numerical results presented here are not meant to be predictors of performance of a specific computer system. Rather, they are meant to lend insight into simplified vector processor models and to show some potential problems that might exist in a vector cache memory. By varying different input parameters over a wide range, the analytical model is used to compare the performance of different alternatives of cache designs.

Figure 2:
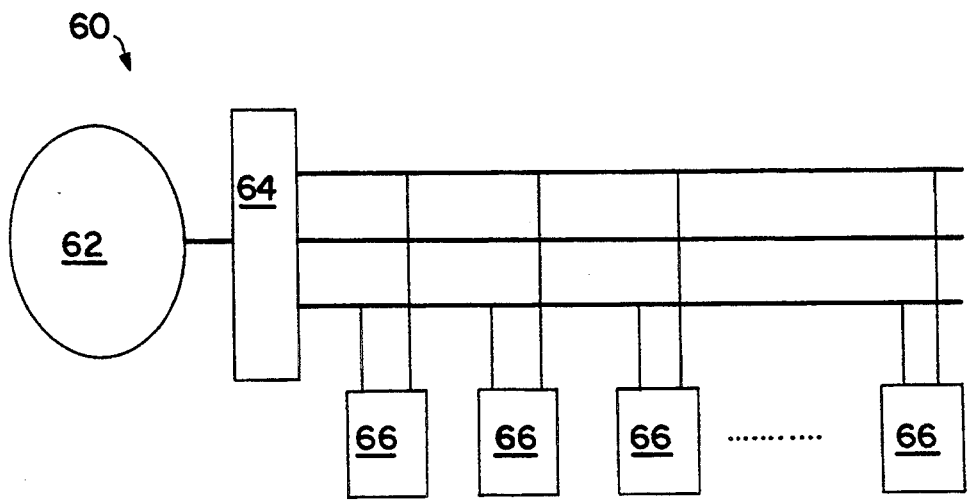
FIG. 2 shows a block diagram of a vector computer model without a cache.
Figure 3:
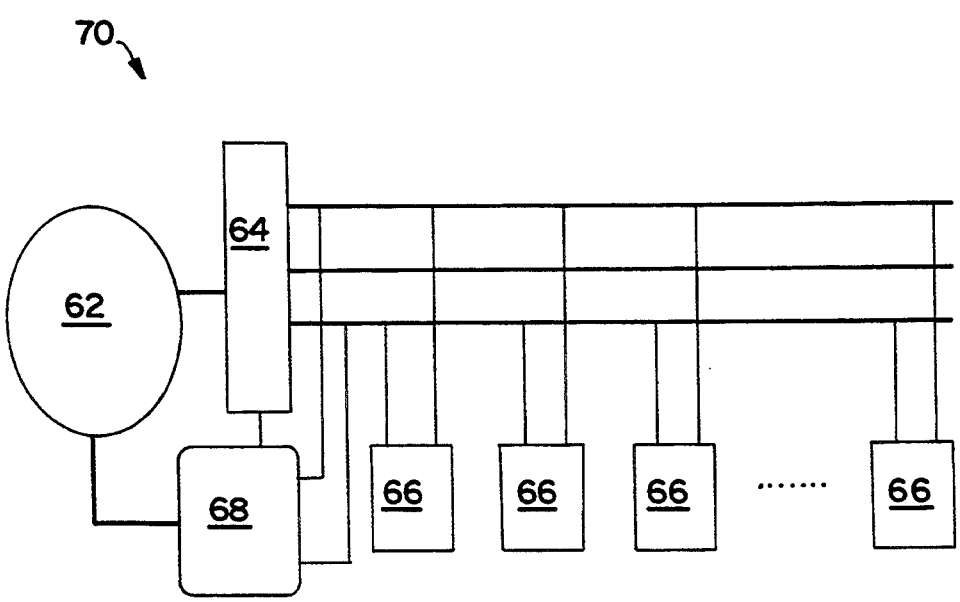
FIG. 3 shows a block diagram of a vector computer model with a cache.

FIGS. 2 and 3 show two simplified vector processor models referred to as MM-model 60 and CC-model 70, respectively. The MM-model 60 shown in FIG. 2 is a vector computer model without a vector cache memory. The CC-model 70 shown in FIG. 3 is a vector computer model with a vector cache memory. Both models have a vector processing unit 62, at least one register 64 with maximum vector length of $V_L$ words, and a set of low order-bit interleaved memory modules (or banks) 66 that are connected to the vector processor 62 through three pipelined buses. Two of the three buses are read buses and the other is a write bus. Each of these buses contains a separate data bus and address bus. There are a total of $M = 2^m$ interleaved memory banks 66, each of which has an access time of $t_m$ cycles. A line of data can be transferred on one of the buses within one cycle. The second processor model (CC-model) shown in FIG. 3 differs from the first one (MM-model) only in that it has a cache memory 68 of size C lines between the processor 62 and memories 66. It is assumed that this cache memory is used purely for vector data similar to the split vector cache of VAX/6000 (see Bandarkar et al. supra).

Cache miss ratio has been used by many researchers as a performance measure to evaluate cache performance. However, it is not a good performance measure in this context because here the performance of the MM-model and the CC-model must be compared. Two performance measures are employed: (1) the total execution time of an application program and (2) the clock cycles per result which is defined as the average number of clock cycles needed to produce one vector element result (see Hennessey supra). In order to estimate the total execution time or the clock cycles per result, the following presents a generic vector computational model that attempts to cover a wide spectrum of numerical algorithms.

The simplified computational model assumes that application programs are blocked into several segments. Some of the vector data that an application program operates on is partitioned into several sub-blocks of size B each. The size B is referred to as a blocking factor. For example, if a matrix is blocked into several submatrices of size b×b, then the blocking factor is $b^2$. A sub-block of data may be used several times by one program segment. A reuse factor, R, is defined as the number of times a block of data is reused. During each vector operation, the processor may load two vectors from the memory simultaneously or load just one vector with the other operand available in a register. It is assumed that the probability that the processor accesses two vector streams simultaneously from the memory during one vector operation is $P_{ds}$ (double stream). The probability that the processor accesses just a single vector stream with the other operand available in a register is $P_{ss}$ ($=1-P_{ds}$). The system performs operations similar to the known SAXPY operations. The processor first loads one or two vectors into its registers and then performs arithmetic operations on the two vectors or on one vector and a scalar in a scalar register. We now determine the length of the second vector for double stream vector accesses. In order to simplify our analysis, we further assume that all single-stream vector accesses are evenly intercepted by one-double-stream accesses if $P_{ds}$ does not equal 0. In other words, every sequence of $BP_{ss}/BP_{ds}=P_{ss}/P_{ds}$ consecutive single-stream vector accesses are followed by one double stream vector access which is again followed by a statistically identical sequence of single stream accesses, and so forth. Thus, one can imagine one of the vectors of length B as a two dimensional matrix with $P_{ss}/P_{ds}+1$ columns and $BP_{ds}$ rows. The vector length of each column is $BP_{ds}$. After every $P_{ss}/P_{ds}$ column accesses of the imagined matrix, the processor loads two vectors to perform vector operations on the first and the second vector. Therefore, the length of the second vector can be considered as $BP_{ds}$. Although the assumed computation model is simplified, it is very close to many realistic applications. For example, the blocked matrix multiply algorithm of certain present systems have blocking factors of $b^2$ since the matrices are blocked into submatrices of size b×b (see Lam et al. supra). The reuse factor of each block is b and each sequence of b-1 single stream vector accesses is followed by a double stream access. Therefore, the fraction of time when the processor accesses a single vector stream is (b−1)/b while the fraction of double stream accesses is 1/b. The length of the first vector is then $b^2$ and the length of the second vector is b. Similarly, the blocked LU decomposition algorithm with a blocking factor of $b^2$ has an average reuse factor of 3b/2 and the blocked FFT algorithm with a blocking factor of b has a reuse factor of $Log_2 b$. Thus, once the blocking factor is specified the vector lengths of two operands in a block can be determined uniquely by $P_{ss}$ and $P_{ds}$.

The access strides of loading the two vectors are denoted by $s_1$ and $s_2$, respectively. Access strides vary widely depending on application programs. In general, unit stride occurs more frequently than other strides in most numerical algorithms (see Fu et al. supra). The term $P_{std1}$ is used to denote the probability that an access stride is 1. If a stride is not 1, it is assumed that other integer values equally likely are taken. Since the present embodiment is directed to memory bank conflicts and cache line conflicts, a stride is assumed to take an integer value in the range of (1,2, ... , M) for the MM-model and in the range of (1,2, ... , C) for the CC-model due to modular operations. It is also assumed that writing results into memory or cache will not delay the normal vector operations. This assumption is not a severe restriction because it can be realized in real machines by having write buffers, separate data bus for writing and separate write port for memories (see Hennessey supra). In summary, the vector computational model consists of the following seven-tuple:

$$VCM = [B, R, P_{ds}, s_1, s_2, P_{std1}(s_1), P_{std1}(s_2)].$$

By properly selecting these model parameters, the model can fit into a variety of numerical algorithms and various vector access patterns. For example, if $VCM = [b, r, 1, 1, P, 1, 1/C]$, then there are double stream vector accesses to columns and rows of a b×b submatrix of a P×Q matrix stored in column-major. Each pair of column and row are used for r times. If $VCM = [b, r, 0, P+1, -, 1/C, -]$ (the symbol "−" indicates that the variable is undefined), then a single vector access stream to a major diagonal of a b×b submatrix of the same P×Q matrix is generated. FFT access and sub-block access can also be easily modeled with some minor modifications as will be discussed hereinafter.

The execution times of the MM-model as shown in FIG. 2 will now be evaluated. The vector performance can be characterized by the execution time for a sequence of operations on a vector of length B, $T_B$. This quantity depends on a number of factors including the overhead for computing the starting addresses and setting up vector controls, the overhead for executing scalar code for strip-mining (fine level of blocking), and the maximum vector register length, $V_L$. Assuming these parameters to be constant and having values known in the art (see Hennessey supra), it can be determined that $$T_B = T_O + |B/V_L| \cdot T_{start} + B \cdot T^M_{elemt} \qquad (1)$$

where $T_{start}$ is the start-up time for each inner most loop and $T^M_{elemt}$ is the time for processing one element of the vector ignoring the start-up time. For purposes of notation, superscript M on a parameter refers to the MM-model vector processor (FIG. 2), and superscript C on a parameter refers to the CC-model vector processor (FIG. 3). The start-up time depends on the memory access time and the type of arithmetic operations to be performed. It should not be difficult to determine its value for a given set of system parameters. It is assumed that $T_{start}$ is constant for a given memory access time. If the system is fully pipelined with one functional unit, $T^M_{elemt}$ should be one in an ideal case.

In reality, $T^M_{elemt}$ is often greater than one because of stalls resulting from memory accesses, data dependencies and control dependencies. Since a primary concern of the present invention is memory system performance, the evaluation will concern memory stalls only. The major source of memory stalls for vector processors is memory conflicts (see Bailey supra; D. T. Harper III, "Block, multistride vector, and FFT accesses in parallel memory systems," *IEEE Trans. on Parallel and Distributed Systems*, January 1991; and W. Oed and O. Lange, "On the effective bandwidth of interleaved memories in vector processor systems," *IEEE Trans. on Computers*, vol. C-34, pp. 949–957, October 1985). There exist a number of storage schemes to minimize memory conflicts (see Budnik et al. supra; Lawrie et al. supra; Harper supra; and R. Raghavan and J. P. Hayes, "On randomly interleaved memories," *Proceedings of Supercomputing-90*, pp. 49–58, November 1990). In the present analysis, only the low-order bit interleaving scheme is considered although some conflict-free dynamic storage schemes can provide about 18% better performance than the simple interleaving scheme (see Harper supra). The term $T^M_{elemt}$ is derived by taking into account memory stalls as follows.

Memory stalls can result from two types of bank conflicts: One is the conflicts between elements in the same vector ("self-interference") denoted by $I^M_b$, and the other occurs between elements from two different vector access streams (cross-interference) denoted $I^M_c$. First consider the number of possible stall cycles of accessing one vector stream with stride $s_1$. When a vector access stream traverses across all the memory banks (one sweep), the number of memory banks visited by the access stream is given by $M/\gcd(M,s_1)$, where $\gcd(M,s_1)$ is the greatest common divisor of M and $s_1$ (see Oed et al. supra and Raghaven et al. supra). If $t_m > M/\gcd(M,s_1)$, a memory conflict occurs and all remaining accesses of the sweep are delayed by $t_m - M/\gcd(M,s_1)$ cycles. Since M is a 2's power, $\gcd(M,s_1)$ is in the form of $2^i$ for some $i = 1, \ldots m-1$. If $\gcd(M,s_1) = 2^m = M$, then each of MVL−1 elements will be delayed by $t_m - 1$ cycles. The number of possible values of $s_1$ within M such that $\gcd(M,s_1) = 2^i$ (i$\epsilon$(1, ... m−1)) is equal to the divisor function of $M/2^i$ which is given by $\phi(M/2^i) = M/2^{i+1} = 2^{m-i-1}$ (see A. J. Pettofrezzo and D. R. Byrkit, *Elements of Number Theory*, Prentice-Hall, 1970). For each such $s_1$, $MVL/(M/2^i) - 1$ sweeps are delayed by $(t_m - M/2^i)$ cycles. The probability of $s_1 = 1$ is $P_{std1}$ and the probability of $s_1$ taking any other value $(2. . . M)$ is $(1 - P_{std1})/(M-1))$. Therefore the total number of stall cycles resulting from accessing a vector of length $M_L$, $I^M_s$, is given by $$I_s^M = \frac{1 - P_{std1}}{M - 1} \left[ \sum_{i = \lceil \log_2 \frac{M}{t_m} \rceil}^{m-1} \left( t_m - \frac{M}{2^i} \right) 2^{m-i-1} \left( \frac{V_L}{M/2^i} - 1 \right) + (V_L - 1)(t_m - 1) \right]$$

The lower limit of the summation in the above equation is determined based on the condition $t_m \leq M/2^i$. Notice that the above equation assumes that $t_m < M$ so that unit stride does not incur any stalls. Algebraic manipulation leads to $$I_s^M = V_L \frac{1 - P_{std1}}{(M-1)} \cdot \left[ t_m + \frac{t_m}{2} \lfloor \log_2 t_m \rfloor - 2 \lfloor \log_2 t_m \rfloor \right]$$

Memory stalls as a result of cross-interference between two vector access streams are considered as follows. Let $s_2$ be the stride of accessing the second vector stream and D be the memory bank difference between the starting addresses of the two vectors. It is assumed that D is uniformly distributed between 1 and M. If the memory bank address of the ith element of the first vector is $is_1$, then the memory bank address of the jth element of the second vector is j $s_2 + D$. Thus whenever the congruence, $s_1 i \equiv s_2 j + D \pmod{M}$, has solutions for $i \epsilon (0,1, \ldots, V_L - 1)$ and $j \epsilon (0,1, \ldots, V_L - 1)$ such that $|i-j| < t_m$, conflicts between the two access streams (cross interferences) occur. The number of stall cycles due to such a conflict is $t_m - |i-j|$. Therefore, the cross-interferences can be calculated by solving the above congruence equation with two variables (see Pettofrezzo et al. supra). The total number of stall cycles due to the cross-interference for a given set of $s_1$, $s_2$ and D is the accumulation of quantities $t_m - |i-j|$ for each pair of solution (i,j), where $i,j \epsilon (0,1, \ldots, V_L - 1)$. The final cross-interference, $I_c^M$, is averaged over all possible values of $s_1$, $s_2$ and D based on the given distributions discussed in the beginning of this section. $T^M_{elemt}$ can now be expressed as:

$1 +$ average stall cycles per element $=$ $$T^M_{elemt} = 1 + P_{ss} \frac{I_s^M}{V_L} + P_{ds} \frac{(2I_s^M + I_c^M)}{V_L} \quad (2)$$

Substituting Equation (2) into Equation (1) the execution time of one block can be determined. It is assumed that the total data size of a program is N which is blocked into several segments of length B. Taking into account the reuse factor, R, the total execution time $T^M_N$ can be expressed as:

$$T_N^M = T_B \cdot R \cdot \left\lceil \frac{N}{B} \right\rceil \quad (3)$$

where $T_B$ is the execution time for a sequence of operations on a vector of length B given in Equation (1).

The execution times of the CC-model as shown in FIG. 3 will now be evaluated. The CC-model has a direct-mapped cache of size $c = 2^c$ lines. It is assumed that a cache line contains one double precision word of data. The processor initially loads one or two vectors into the cache while performing the designated vector operations. The process of the initial loading will take the amount of time given by Equation (1). After the vectors are loaded into the cache, the remaining operations on the same set of data are expected to be performed in the cache without accessing memories in an ideal situation. The total execution time of the CC-model shown in FIG. 3 is given by $$T_N^C = \left\{ T_B + (R - 1) \left[ T_0 + \left\lceil \frac{B}{V_L} \right\rceil (T_{start} - t_m) + BT^C_{elemt} \right] \right\} \left\lceil \frac{N}{B} \right\rceil \quad (4)$$

where $T_B$ covers the effects of compulsory and capacity misses as discussed above. Notice that the start up time after the initial vector loading is decreased by $t_m$ since the reused vector is in the cache provided that it has not been replaced due to a conflict. Similar to the analysis of the MM-model, $T^c_{elemt}$ is used to include memory stalls due to cache misses. Cache misses may have a significant effect on system performance since for each cache miss the processor has to stall for $t_m$ cycles due to the fact that cache misses may not be easily pipelined. The following considers the effects of cache misses caused by line interferences on the system performance.

Suppose the processor tries to load a vector of length B into the vector cache with a random stride $s_1$ having the distribution described in the beginning of this section. The number of cache lines occupied by the vector is given by $C/\gcd(C, s_1)$. Thus, there will be $B - C/\gcd(C,s_1)$ self-interferences if the vector length B is greater than or equal to $C/\gcd(C,s_1)$. Again the number of $s_1$'s such that $\gcd(C,s_1) = 2^{(c-i)}$ is $2^{i-1}$ (divisor function) (see pettofrezzo et al. supra). If $\gcd(C,s_1) = C$, then there would be $B-1$ conflicts. Therefore, the average number of stalls due to self-interference misses in the B-element vector is given by $$I_s{}^C(B) = \frac{1 - P_{std1}}{C - 1} \left[ C - \sum_{i=1}^{\lceil \log_2 \frac{C}{B} \rceil} \left( B - \frac{C}{2^c} - 1 \right) 2^{i-1} + B - 1 \right] \cdot T_m \quad (5)$$

where the upper limit of the summation is determined in such a way that $B \geq C/2^i$ is always positive. Notice that there is no self-interference if the access stride is one and the block size B is less than cache size. For every self-interference miss the processor stalls for $t_m$ cycles. Algebraic manipulation leads to $$I_s{}^C(B) = \frac{1 - P_{std1}}{C - 1} \cdot \frac{1}{3} (3B^2 \lfloor \log_2 B \rfloor - 2 \cdot 2^{2\lceil \log_2 B \rceil} - 1) \cdot t_m \quad (6)$$

Since B is a power of 2, $$I_s{}^C(B) = \frac{1 - P_{std1}}{3(C - 1)} (B^2 - 1) \cdot t_m$$

The cross interference misses, $I^C{}_C$, can be calculated in a similar way as for the $I^M{}_C$ or using a known "footprint" model assuming that the two vectors are independent (see Stone supra and Lam et al. supra). The probability that any one element of the second vector falls into the footprint of the first vector is B/C. There are $BP_{ds}$ elements in total in the second vector. Therefore, the total stalls due to cross-interferences are given by $I^C{}_C = (B^2 P_{ds}/C) t_m$. Thus, the time for processing one vector element $T^c{}_{elemt}$, is $$T^C_{elemt} = 1 + P_{ss} \frac{I_s{}^C(B)}{B} + P_{ds} \frac{(I_s{}^C(B) + I_s{}^C(BP_{ds}) + I_c{}^C)}{B} \quad (7)$$

Substituting Equation (7) into Equation (4) the total execution time of the direct-mapped CC-model can be determined.

A performance analysis is now presented for the two vector computer systems based on the analytical model presented above. A term referred to as the "average clock cycles per result" is used as a performance measure. This term is obtained by dividing the total execution time by the product of N and R.

In FIGS. 4–12 the values of $V_L$ and $T_{start}$ are fixed at 64 and $30 + t_m$ respectively (see Hennessey et al. supra). The probability of unit stride access, $P_{std1}$, is fixed at 0.25 (see Fu et al. supra).

Figure 4:
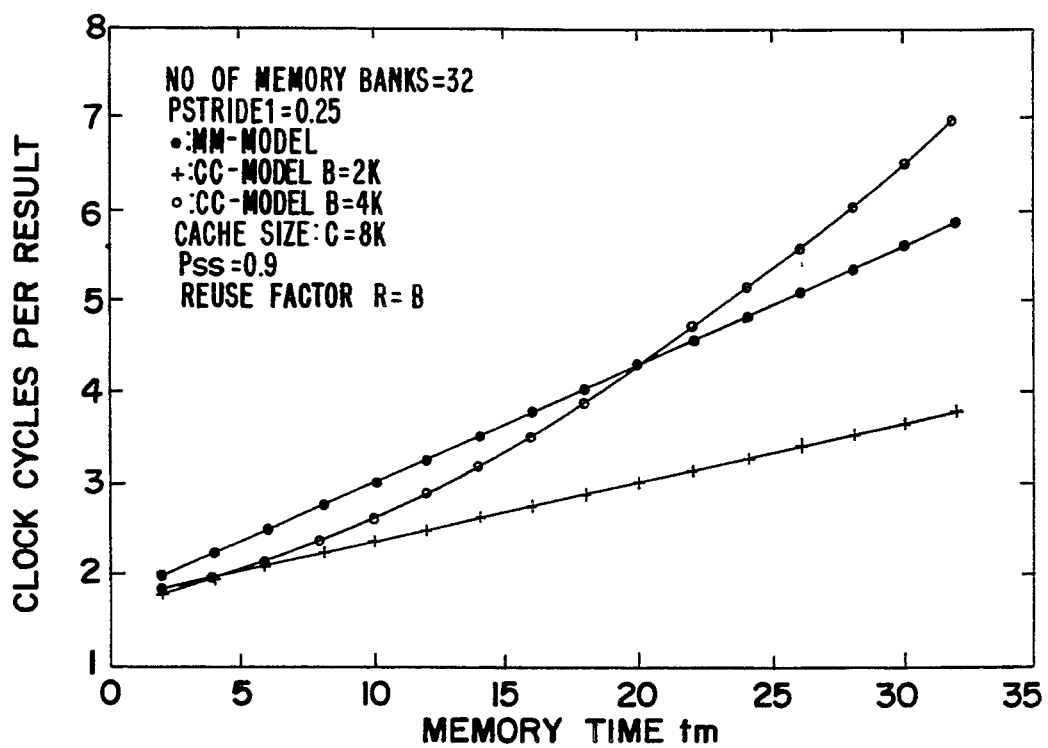
FIG. 4 shows a graph of clock cycles per result vs. memory access time.
Figure 5:
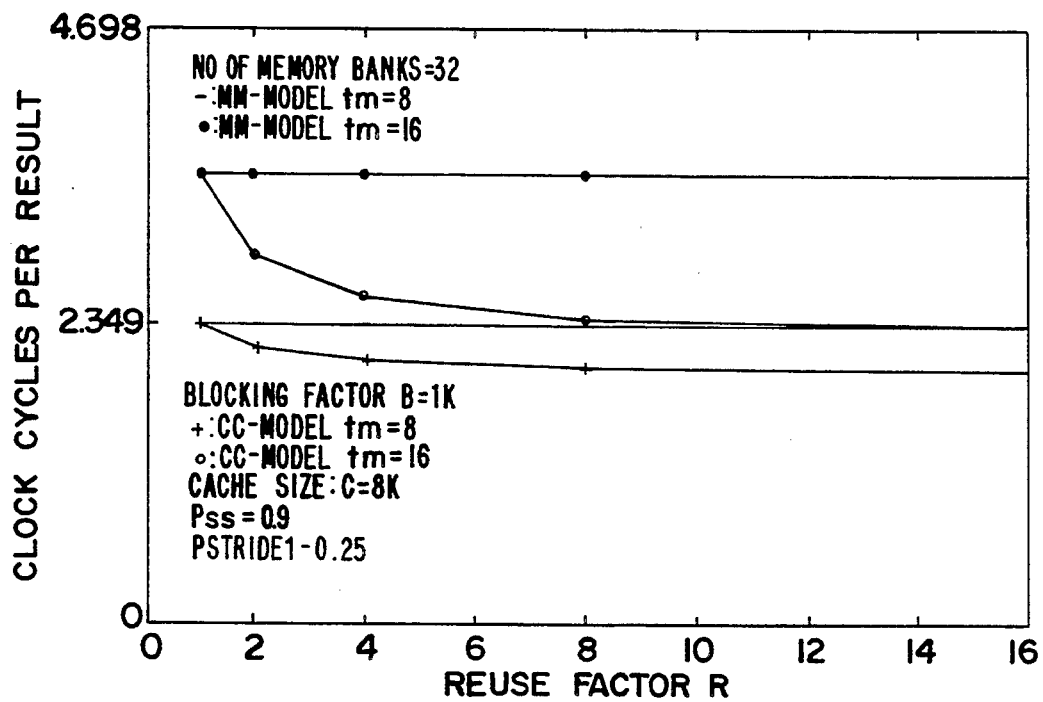
FIG. 5 shows a graph of clock cycles per result vs. a reuse factor.

In FIG. 4 the "average clock cycles per result" is shown as a function of memory access time in terms of processor cycles. If memory access time is small, it can be seen from FIG. 4 that adding a direct-mapped cache memory does not help. The performance of the MM-model performs even better than the CC-model that has a cache memory. This is primarily due to the fact that any one of irregularly distributed cache misses results in a memory access that takes $t_m$ cycles. The interleaved memory with pipelining may well satisfy the bandwidth requirement of the processor. However, as the speed gap between processor and memory increases, (i.e., the number of cycles needed for accessing memory increases), the performance of the CC-model takes over. With the blocking factor of 4K, the CC-model outperforms the MM-model after the memory access time exceeds 20 cycles. If the blocking factor is 2K, the CC-model shows better performance when the memory access time is over 7 cycles. It is known that cache performance depends on how often data are reused after they have been loaded into the cache. In FIG. 4, the reuse factor is fixed at B. In order to observe how the reuse factor affects the performance of vector caches the "clock cycles per result" term can be plotted as a function of the reuse factor R while fixing the blocking factor at 1K as shown in FIG. 5. Two curves are plotted for CC-model corresponding to memory access times of 8 and 16 cycles, and two other similar curves are plotted for the MM-model. As expected, the performance of the two processor models is the same when the reuse factor is 1. Recall that the initial loading of the cache is pipelined and is done concurrently with the vector operation. With the system parameters indicated in the figure, whenever the reuse factor is more than one, the CC-model performs better than the MM-model. Moreover, it can be seen in this figure that after the reuse factor exceeds certain value, the performance change is not significant. It was noted above with reference to FIG. 4 that different blocking factors show different performances. To observe this effect more closely, the performance can be plotted against the blocking factors with other parameters being fixed at the values shown in FIG. 6. For memory access time of 16 cycles, the blocking factor can not be more than 4K after which the vector cache performs poorly. The performance cross point of the CC-model and MM-model is for the blocking factor to be about 5K if memory access time is 32 cycles. However, our cache size for the CC-model is 8K words implying that only a small portion of the cache is utilized.

Figure 6:
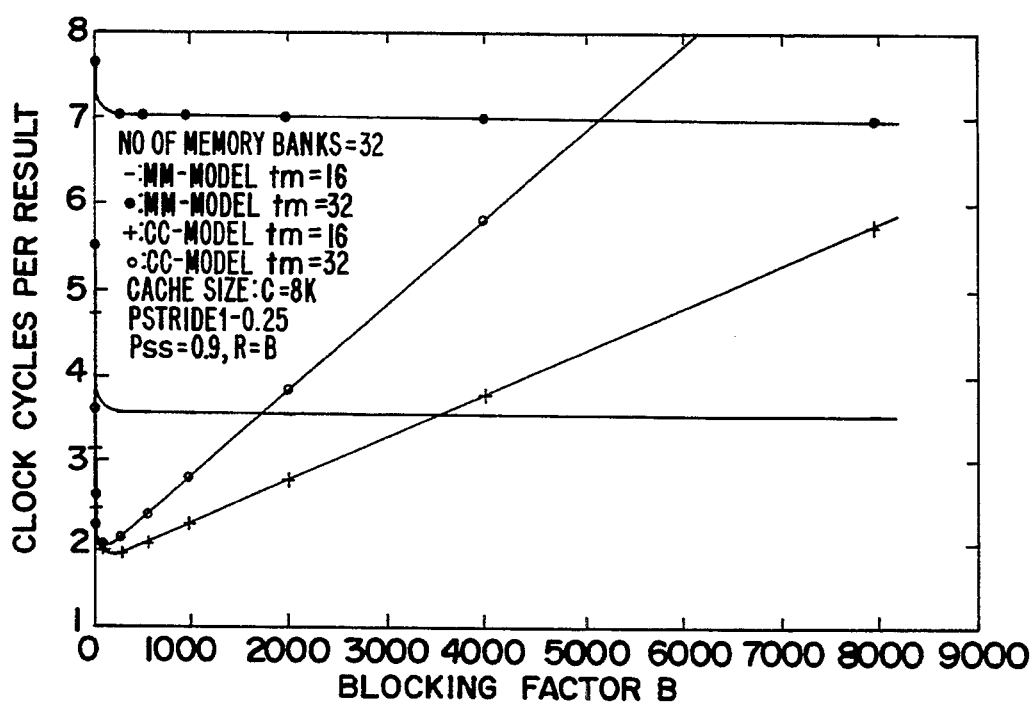
FIG. 6 shows a graph of clock cycles per result vs. a blocking factor.

From FIGS. 4–6, the following observations are in order. First, as the memory access time increases with respect to the clock time of processors, vector cache memory can provide better performance than the machine without cache even with a small reuse factor; Second, the performance improvement of the direct-mapped cache for vector processor is limited as shown by these figures. Finally, the utilization of the vector cache is poor in order to sustain a reasonable performance.

It can be observed from the above performance analysis that the performance gain resulting from adding a conventional direct-mapped cache into a vector computer is not very impressive. In order to obtain a reasonable performance improvement over the MM-model, the cache utilization has to be very low. It will now be shown that the cache mapping scheme of the present invention provides significant performance improvement over the conventional cache designs. Moreover, the cache utilization can be close to one without significant performance degradations. Three typical vector access patterns in vector processing are considered: random multistride access, subblock access and FFT access. Unless otherwise specified, all the numerical results reported in this section are computed by fixing $V_L$ and $T_{start}$ at 64 and $30 + t_m$ respectively (see Hennessey et al. supra).

Figure 7:
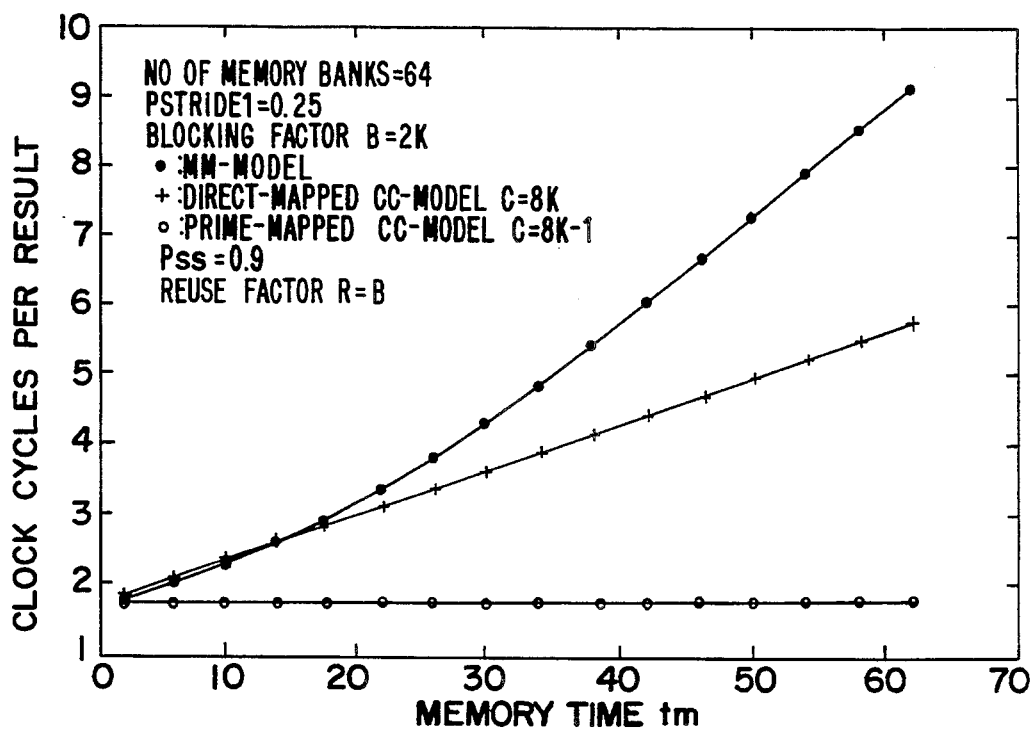
FIG. 7 shows a comparison between direct mapped cache and prime mapped cache with reference to memory time.

For the random stride access pattern, the self-interference misses occur only when the stride is an integral multiple of the cache size. Since the modulus in the prime-mapped cache is a prime number, interference misses are minimized. Therefore, $I^c_s$ is given by $$I_s^C(B) = \frac{(1 - P_{std1})(B - 1)}{C - 1} t_m \qquad (8)$$

assuming that the stride is uniformly distributed between 2 and C if it is not 1. For cross-interferences, the footprint model similar to the direct-mapped cache can be used to estimate $I_C^C$. Substituting Equation (8) into Equation (7) the time for processing one vector element for prime-mapped cache can be obtained. The total execution time is calculated using Equation (4). In FIG. 7, clock cycles per result are plotted as a function of memory access time. Three curves are plotted corresponding to the MM-model, the direct-mapped CC-model and the prime-mapped CC-model respectively. Compared to FIGS. 4-6 the number of memory banks has increased from 32 to 64. As the memory access time increases with respect to the processor cycle time, the performance of the MM-model gets worse. The performance of the direct-mapped cache catches up with the MM-model after the memory access time exceeds about 24 cycles. However, average cycles per result of the CC-model increase though with a smaller slope than that of the MM-model. The prime-mapped cache, on the other hand, shows little change in performance as memory access time increases. It outperforms both the MM-model and the direct-mapped CC-model over entire range of memory times considered. When the memory access time matches the number of memory modules (64), the prime-mapped CC-model runs three times faster than the direct-mapped CC-model and almost five times faster than the MM-model.

Figure 8:
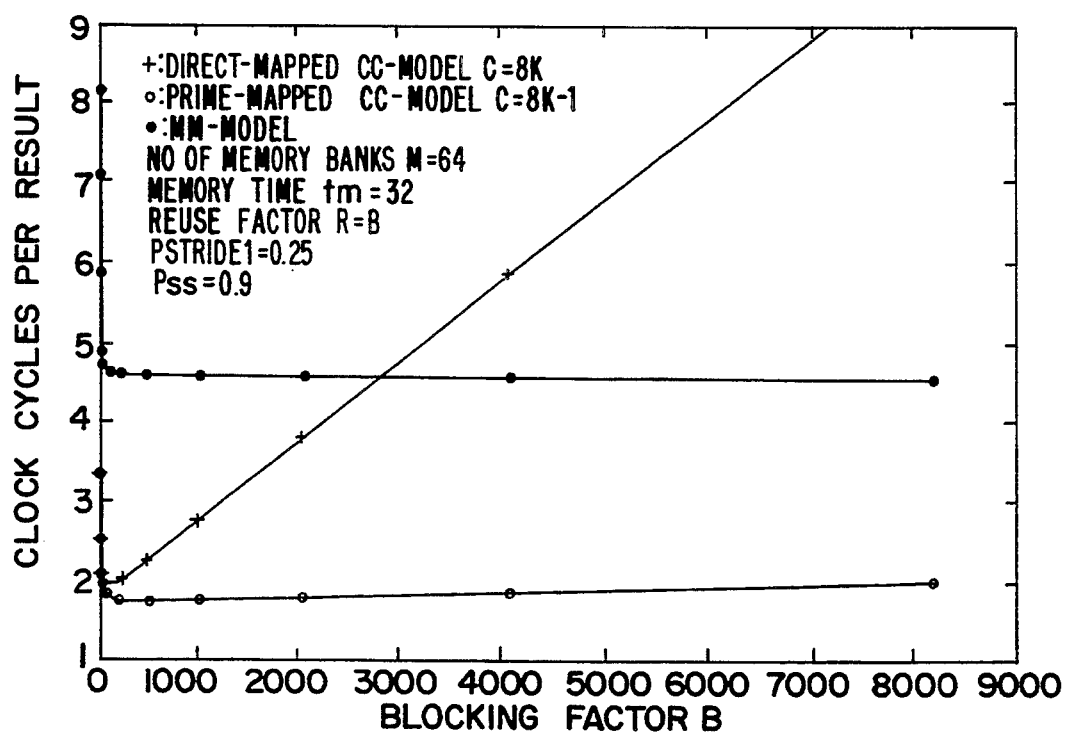
FIG. 8 shows a comparison between direct mapped cache and prime mapped cache with reference to a blocking factor.

As was observed above, the blocking factor has a significant impact on the performance of direct-mapped vector cache. In order to observe this effect on prime-mapped cache, FIG. 8 shows the performance as a function of blocking factor for the three machine models with the memory cycle time being half of the number of banks. As shown in FIG. 8, average cycles per result for the direct-mapped cache quickly cross over that of the MM-model after the blocking factor is about 3K, while the average cycles per result for the prime-mapped cache remains flat. Thus, the prime-mapped cache is not very sensitive to the blocking factor for the random stride access.

Figure 9:
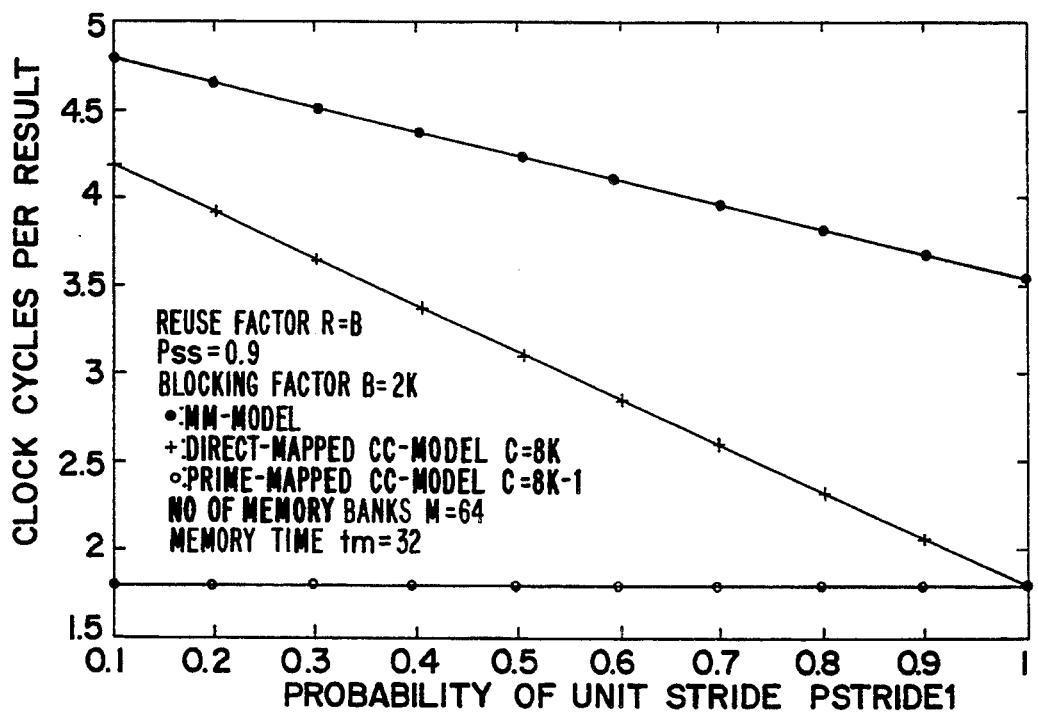
FIG. 9 shows a graph of the effect of stride distribution on performance.

In FIGS. 7 and 8, the probability of accessing a vector with stride 1, $P_{std1}$ has been fixed at 0.25 which is the average value taken from known experimental data (see Fu et al. supra). The effect of this parameter on system performance, is shown in FIG. 9 where clock cycles per result is plotted by varying $P_{std1}$. High probability of unit stride will reduce both memory conflicts and cache line conflicts. As shown in FIG. 9, as this probability increases, the performance difference between the two mapping schemes comes close. When the probability of having unit stride is 1, the performance of the two mapping schemes is the same. Whenever this probability is nonunit, the prime-mapped cache performs better than the direct-mapped cache.

Figure 10:
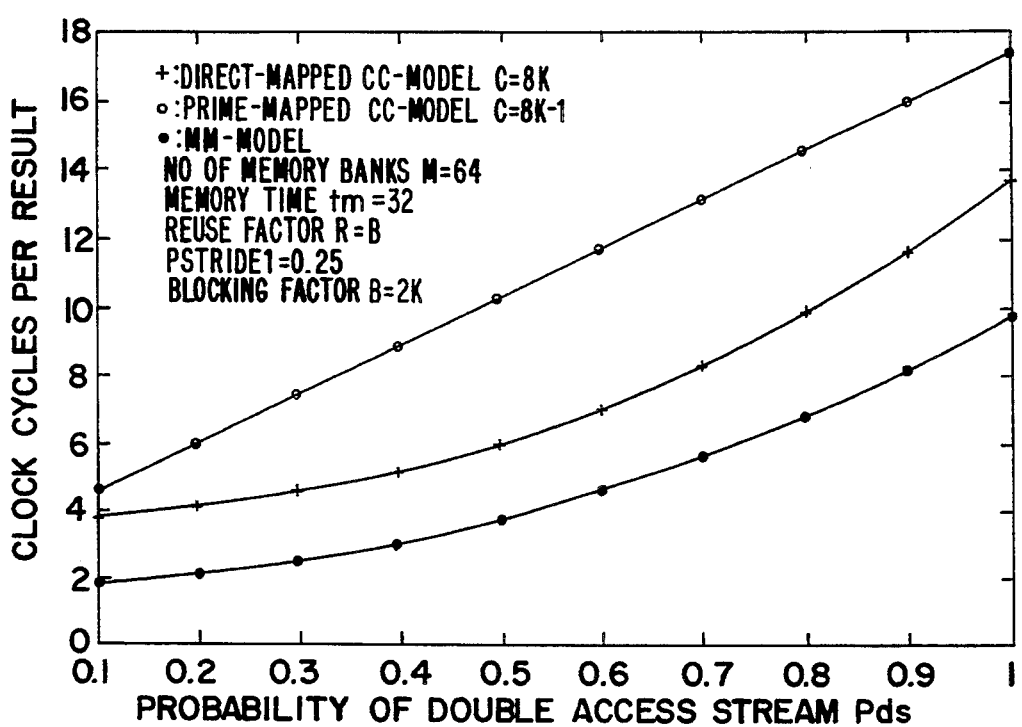
FIG. 10 shows a graph of clock cycles per result vs. proportion of double stream access.

FIG. 10 shows the effect of proportion of double access streams on the performance of the three models. When the proportion of double access streams is large, cross-interferences between the two vectors in the cache becomes large. It is shown in FIG. 10 that the cycle time increases with the increase of the proportion of double stream accesses. Note that the cross-interference in the prime-mapped cache is severer than that in direct-mapped cache because the footprint of the former is larger than the footprint of the latter. Nevertheless, the prime-mapped cache still performs better than the direct-mapped cache over all possible fractions of double stream accesses. The performance difference ranges from 40% to a factor of 2 (200%).

Figure 11:
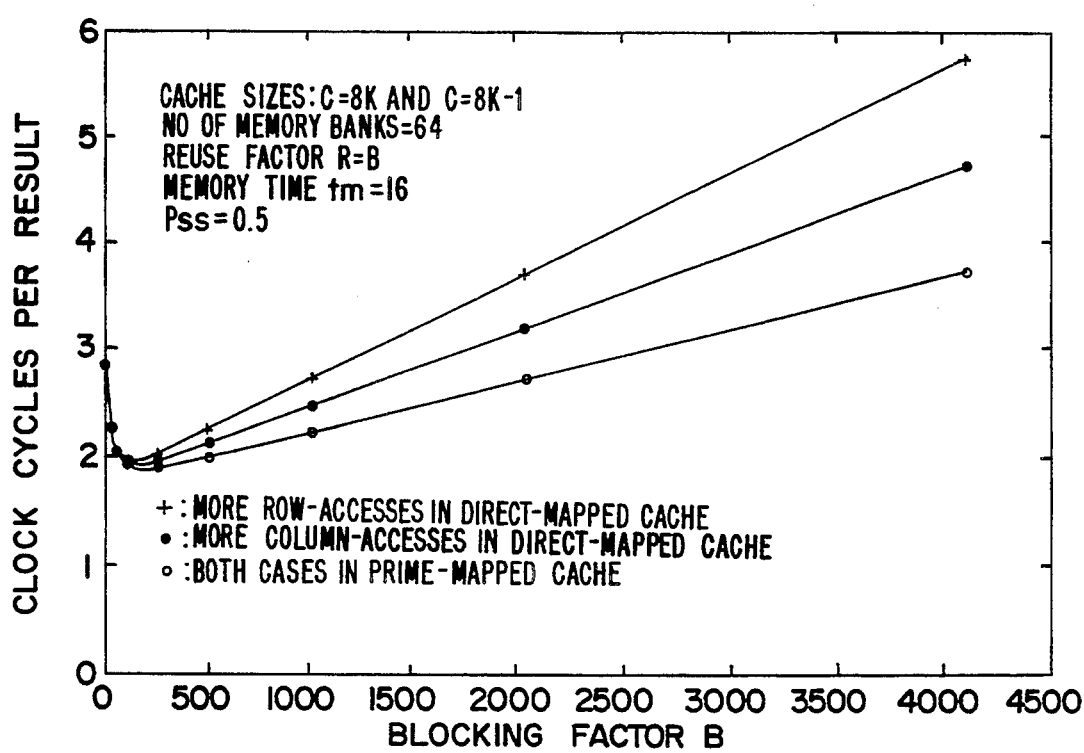
FIG. 11 shows a graph of performance of row and column accesses to a random sized matrix stored in column major.

If the stride of one vector is fixed at 1 and it is assumed that the other stride is random, then we have accesses to rows and columns of a random sized matrix. FIG. 11 shows the performance of such access patterns. If columns of the matrix were accessed more often than rows, then one would expect a small number of interferences in the direct-mapped cache because the stride is one for a column access. If rows were accessed more often, on the other hands, one would expect more interferences in the direct-mapped cache as shown in FIG. 11. In both cases, however, the prime-mapped cache shows the same performance which is better than that of direct-mapped cache.

Sub-block accesses have proven to be important in many vector processing applications. Blocked matrix multiplication presents a situation where there is a need to access a submatrix of a large matrix. Let the original large matrix be dimensioned $P \times Q$, and the sub-block be dimensioned $b_1 \times b_2$. A sub-block access can be characterized as $b_2$ stride-1 accesses to column vectors of length $b_1$. The distance between the starting addresses of two successive column vectors is P.

Sub-block accesses can be easily made conflict free for any arbitrary two dimensional matrix by properly selecting blocking factors. Notice that this is either impossible or prohibitively costly for the MM-model since the modulus is a power of 2 (see Harper supra). Consider the above matrix with dimensions $P \times Q$ that is stored in a column-major. To make accesses to a sub-block of dimension $b_1 \times b_2$ conflict free in the prime-mapped cache, one must select $b_1$ and $b_2$ in such a way that the following conditions are satisfied.

$$b_1 \leq \min(P \bmod C, C - P \bmod C),$$

$$b_2 \leq \left\lfloor \frac{C}{b_1} \right\rfloor$$

A row-major storage can also be realized by similarly interchanging the corresponding dimensions. It can be shown that a sub-block with $b_1$ and $b_2$ satisfying the above conditions can be stored in the prime-mapped cache without self-interference. This is because that $b_1$ elements of any column vector are stored in consecutive memory locations and hence no conflict can occur among them. Moreover, since (P mode C)$\geq b_1$ the first elements of any two consecutive column vectors are mapped into two cache locations that are at least $b_1$ lines apart as long as $b_2 \leq |C/b_1|$. The fraction of the cache being used is $b_1 b_2/C$. If $b_1 = \min$ (P mode C, C - P mod C), and $b_2 = |C/b_1|$ then the cache utilization is close to 1. In other words, conflict free access to the submatrix is possible even with the cache utilization approaching 1.

The FFT accesses result from a known Fast Fourier Transform (FFT) algorithm (see J. W. Cooley, *The Structure of FFT and Convolution Algorithms*, Research Report, IBM T. J. Watson Research Center, 1990). The FFT is a basic tool in various scientific and engineering disciplines, ranging from oil exploration to artificial intelligence. Efficient FFT computation is desirable for any engineering/scientific computers. While the FFT algorithm performs well on scalar computers, it does not perform as well on vector computers because the access stride changes after each stage of computation. Moreover, other than the final stage all strides are 2's powers, which results in a lot of line conflicts in a direct-mapped cache. The FFT in its original form can keep only a very small amount of data in the cache if the data size (which has to be a power of 2) is greater than the cache size. Efforts have been made during the past 20 years to optimize the performance of FFT algorithms on vector machines (see Cooley supra).

One way to implement the FFT algorithm in a memory hierarchical system is to map the input data into a two dimensional array (see Cooley supra). Suppose an N-point data array to be transformed can be represented as $N = B_2 \times B_1$. Then the input data can be considered to be a matrix of $B_1$ columns and $B_2$ rows. The matrix is stored in a column-major. The algorithm proceeds by first doing $B_1$-point row FFTs for $B_2$ times each of which is expected to be done within the local cache. After all $B_2$ row FFTs are done, "twiddle" factors are multiplied and column FFTs are preformed for $B_1$ times. Again it is expected that each of the column FFTs is done inside the cache. If $B_2$ is less than the cache size, each of the column FFTs can be done in the cache without misses except for the compulsory misses since the array is stored in a column-major. However, the row FFTs of the first step may not be guaranteed to be done inside the cache without misses. Depending on the value of $B_2$, conflict misses may occur. The number of interference misses is given by $B_1 - C/\gcd(B_2, C)$ for $B_1 > C/\gcd(B_2, C)$.

The total execution time of this algorithm on the direct-mapped cache can be determined by using Equation (4) twice. First, substitute B and R in (4) by $B_1$ and $\log_2 B_1$, respectively. $T^c_{elemt}$ should include the above self interferences for a given B—2. Note that $P_{ds} = 0$ if it is assumed that twiddle factors are available in the registers. Second, Equation (4) is used again with B and R being replaced by $B_2$ and $\log_2 B_2$, respectively. $T^C_{elemt}$ can be considered to be 1 assuming that $B_2 < C$. The final total execution time is the sum of the above two times. The execution time of prime-mapped cache can be done similarly by noting that there are no self-interference misses unless $B_2 = C$. Compulsory misses ($T_B$) should also be adjusted based on the FFT stride characteristics.

Figure 12:
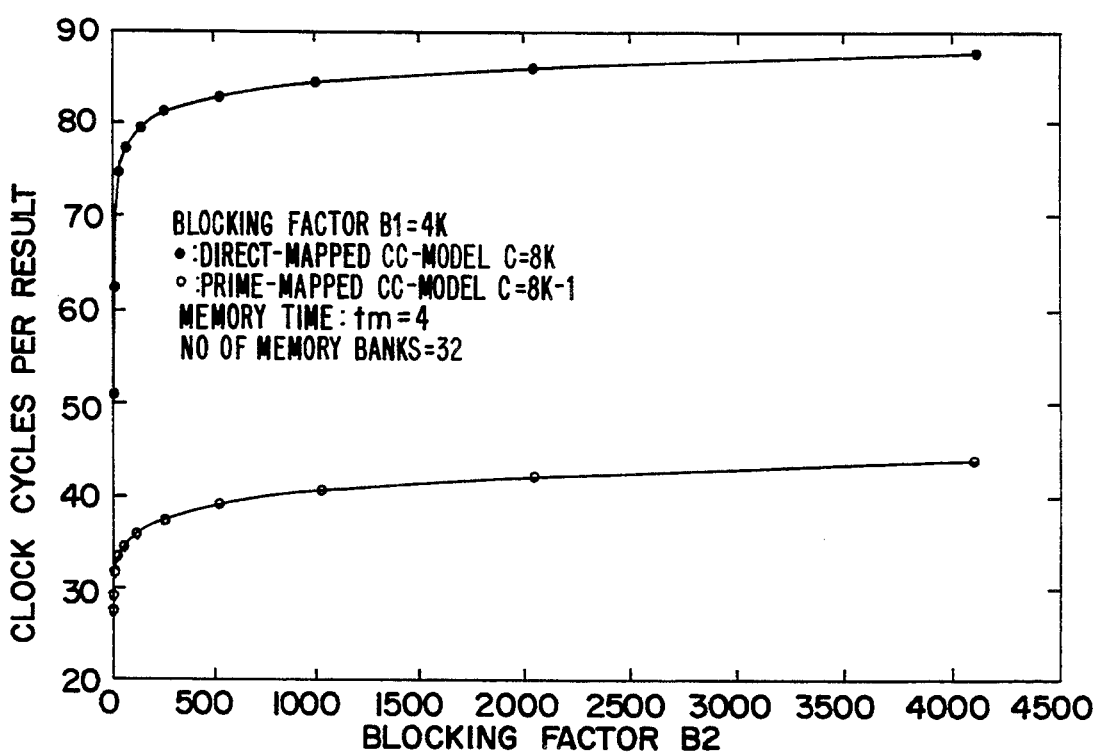
FIG. 12 shows a comparison between direct mapped cache and prime mapped cache for FFT access.

FIG. 12 shows the performance comparison of the FFT algorithm on the two different cache organizations. The curves are the average clock cycles per point which is the total execution time divided by N. In FIG. 12, one dimension is fixed while the other is varied. It is observed from these curves that the prime-mapped cache outperforms the direct-mapped cache by a factor of more than 2. The improvement is valid over all possible values of the blocking factor $B_2$.

For example, certain optimized FFT algorithms (such as for the IBM 3090 vector processor) which handle two dimensional FFTs and have relatively small values for $B_1$ are known (see Cooley supra). In this case a group of rows is loaded into the cache at each computational step, and after all of the rows are transformed, $B_1$ $B_2$-point column FFTs are performed. The access pattern of this optimized FFT algorithm is similar to the sub-block access since it essentially loads a submatrix into the cache. In this algorithm, the selection of $B_2$ must be made carefully in order to maximize cache hit ratio since improper $B_2$ can make the cache performance very poor. A good choice of $B_2$ may lead to other complex algebraic manipulations. Moreover, if $B_2$ is greater than the cache size, it is not known whether the algorithm would still be efficient.

With the prime-mapped cache, the FFT algorithm can be implemented very easily. Optimization is guaranteed as long as the block size is less than the cache size.

The present invention provides an innovative cache mapping scheme for vector computers, called prime-mapped cache. The cache lookup time of the new mapping scheme operates in virtually the same or less time as direct-mapped cache systems. Consequently, the generation of cache addresses for accessing the prime-mapped cache can be done in parallel with normal address calculations. This address generation takes such a relatively short amount of time due to the special properties of the Mersenne prime. Therefore, the new mapping scheme does not result in any performance penalty as far as the cache access time is concerned. The hardware cost introduced by the prime mapping scheme includes 2 multiplexors, a full adder and a few registers.

An analytical performance model has also been developed to evaluate the performance for a generic vector computational model covering a wide spectrum of numerical algorithms. The analytical model is simple and precise for a given set of vector access patterns. It is shown that the prime-mapped cache outperforms both the vector computer without cache and the vector computer with a direct-mapped cache for all vector access patterns considered. The performance improvement ranges from 40% to a factor of 3 depending on the memory cycle time, blocking factor and access patterns.

Cache memory can improve the performance of vector processing provided that application programs can be blocked. With the new mapping scheme, the cache memory can provide significant performance improvement which will become larger as the speed gap between processor and memory increases.

Numerical results based on the performance models described above can be used to compare the performance of the direct-mapped cache with that of the prime-mapped cache. Although cache miss ratio has been used by many researchers as a performance measure to evaluate cache performance, it is not a very good performance measure in vector processing environment due to pipelining of memory accesses as mentioned earlier. For the present evaluation the increased speed gained called "speeedup" can be examined. The term speedup refers to the increase in speed resulting from adding cache memories into the MM-model vector computer. The speedup is defined as the ratio of the execution time of a given algorithm on the MM-model to the execution time of the same algorithm on the CC-model. Except where indicated otherwise, each of FIGS. 13–20 are for the case $V_L=64$, $T_{piv}=15$, $T_{scal}=1$, $T_0=T_m+15$, and $T_{start}=t_m+15$. These parameters are selected to be close to the commonly accepted known values.

Figure 13:
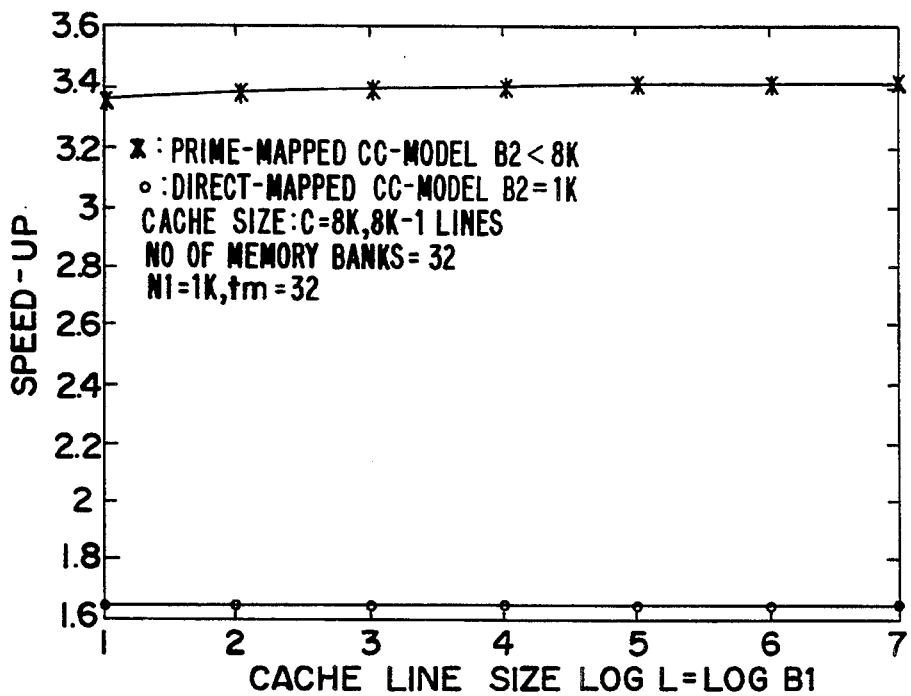
FIG. 13 shows a graph of vector speedup for matrix multiplication vs. cache line size.

FIG. 13 shows the speedup as a function of memory access time in terms of processor cycles. If memory access time is small, it can be seen from FIG. 13 that adding a direct-mapped cache memory does not help. The performance of the MM-model performs even better than the CC-model that has a cache memory, particularly when blocking factor is large. This is primarily due to the fact that any one or irregularly distributed cache misses results in a memory access that takes $t_m$ cycles. The interleaved memory with pipelining may well satisfy the bandwidth requirement of the processor. However, as the speed gap between processor and memory increases, i.e., the number of cycles needed for accessing memory increases, the performance of the CC-model takes over. With the blocking factor of 1K, the speedup of the CC-model over the MM-model is about 1.6 for memory access time being 32 cycles. It is clear from FIG. 13 that adding the newly proposed cache memory triples the vector performance of the matrix multiplication algorithm after the memory time exceeds 28 cycles.

Figure 14:
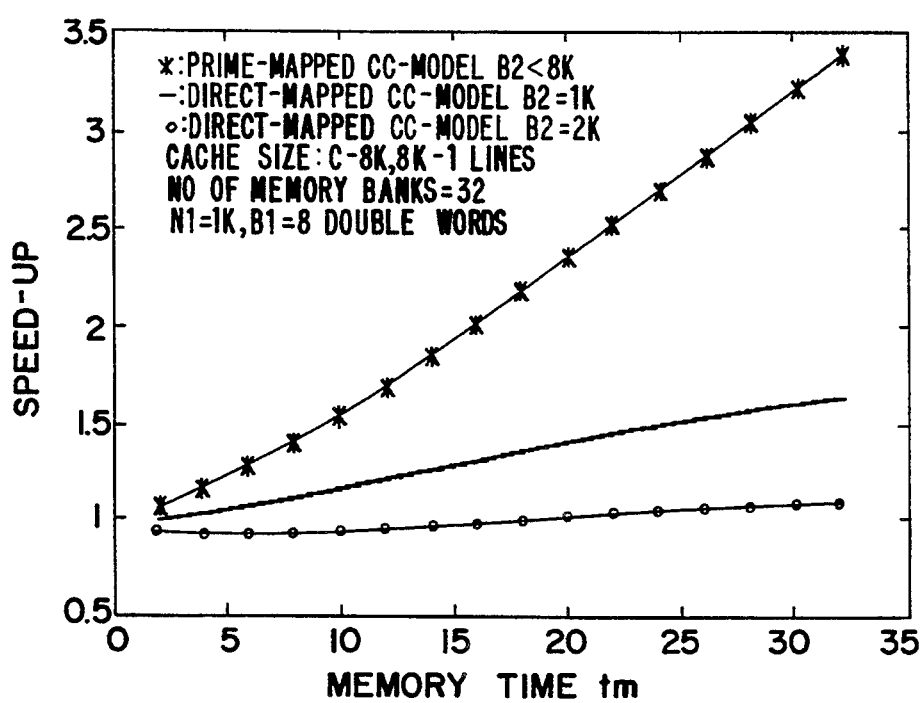
FIG. 14 shows a graph of vector speedup for matrix multiplication vs. memory access time.
Figure 15:
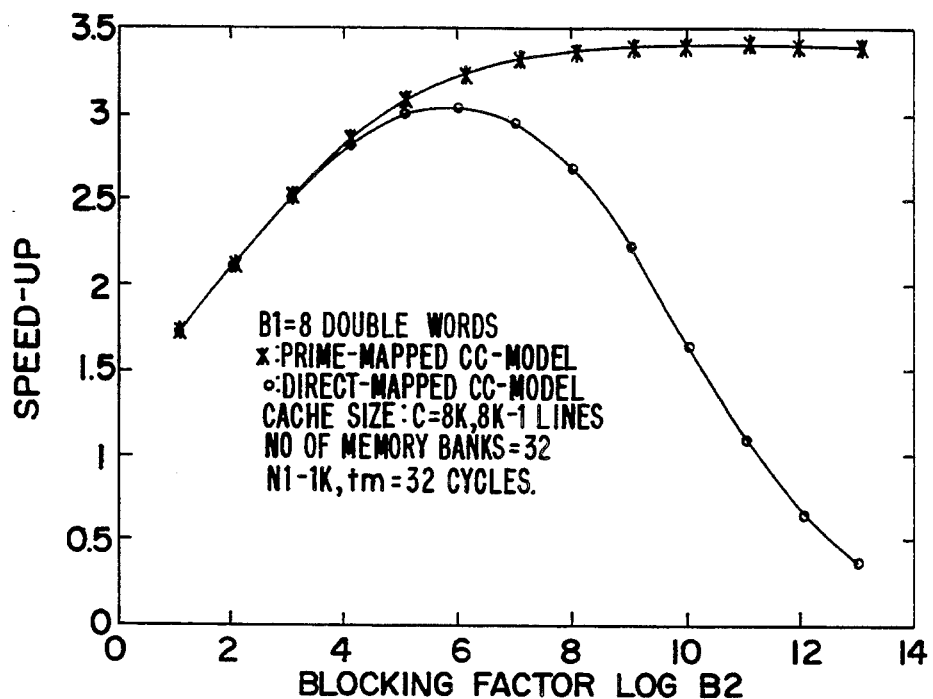
FIG. 15 shows a graph of vector speedup for matrix multiplication vs. a blocking factor.

In FIG. 14, the blocking factor $B_2$ which is the number of columns in each submatrix is fixed at 1K while the blocking factor $B_1$ which is the length of each column in a submatrix and also the cache line size is varied. Since matrix Y is stored in column-major, elements along any column are in consecutive memory locations. As a result, changing subcolumn size does not change number of line conflicts as long as $B_2$ does not change, which makes the two curves remain relatively flat. However, when $B_1$ is fixed and $B_2$ changes, the performance of the direct-mapped CC-model drops drastically after $B_2$ exceeds 64 as shown in FIG. 15. The initial increase in speedup of direct-mapped CC-model is due to the increase of vector length (within $V_L$) of each vector operation. In both cases (FIGS. 14 and 15), the prime-mapped cache organization performance is significantly better than the direct-mapped CC-model. Moreover, the speedup remains unchanged for all possible blocking factors because it is conflict-free as long as the subblock is less than cache size.

Figure 16:
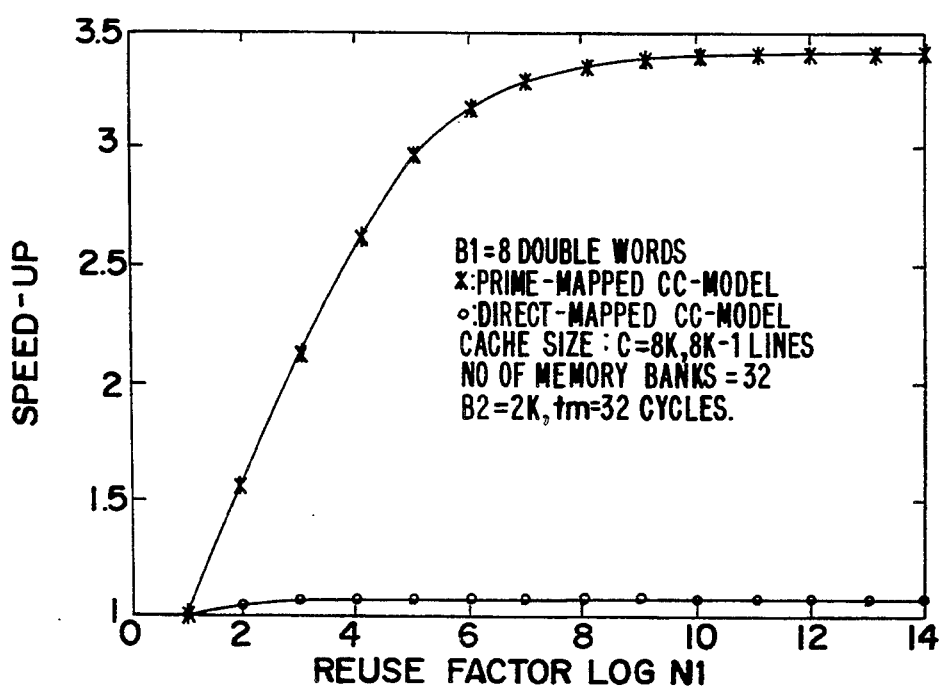
FIG. 16 shows a graph of vector speedup for matrix multiplication vs. a reuse factor.

It is known that cache performance depends on how often data are reused after they have been loaded into the cache. In the above figures, the reuse factor is the column length of matrix X, $N_1$, which is fixed at 1K. In order to observe how the reuse factor affects the performance of vector caches we plotted speedup as a function of reuse factor $N_1$ while fixing the blocking factors as shown in FIG. 16. As expected, the performance of the two cache organizations is the same when the reuse factor is 1. The initial loading of the cache is pipelined and this is done concurrently with the vector operation. The performance difference between the two mapping schemes grows larger as the reuse factor increases due to the fact that the prime-mapped CC-model has a much higher chance of finding in cache the reused data than the direct-mapped counterpart does. Moreover, it can be seen in FIG. 16 that after the reuse factor exceeds certain value ($2^7$), the performance change is not significant.

Figure 17:
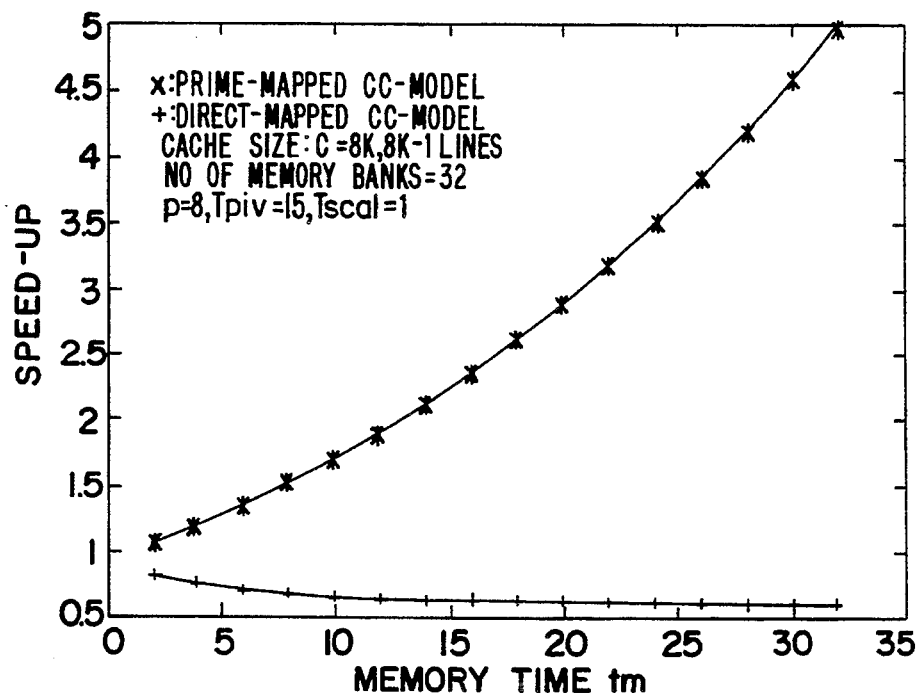
FIG. 17 shows a graph of vector speedup of LU decomposition algorithm on the CC-model vs. access time.

FIG. 17 shows the vector speedup of the Gaussian elimination algorithm as a function of memory access time, $t_m$. It can be seen from the figure that the performance difference between the two cache mapping schemes is dramatic. The direct-mapped CC-model does not improve the vector performance but worsens the performance, i.e., the speedup is less than 1. The main reason for this is the following. When the performance of the matrix multiplication algorithm is examined, it is noted that the blocking factor has a significant impact on the cache miss ratio. After the blocking factor exceeds a certain value, the cache performs very poorly. In the Gaussian elimination algorithm, the submatrix size changes after every reduction step starting from the maximum size which is dimensioned p x (N-p). Therefore, it is unavoidable that the cache has to hold a subblock of bad size during the course of factorization of a sufficiently large matrix. In addition, both column and row accesses are needed in the algorithm, which makes it virtually impossible to have a good access stride. Furthermore, the fact that cache misses are not easily pipelined makes the performance of direct-mapped CC-model worse than that of MM-model. The prime-mapped cache, on the other hand, performs up to 5 times better than the MM-model for large memory cycled times as evidenced in FIG. 17.

Figure 18:
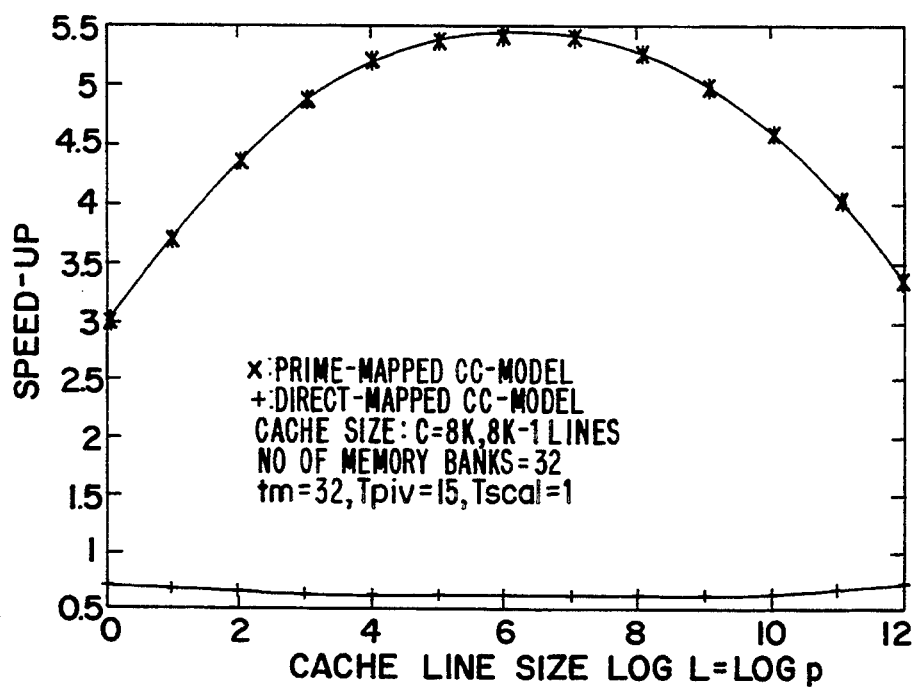
FIG. 18 shows a graph of vector speedup of LU decomposition algorithm on the CC-model vs. a cache line size and a blocking factor.

The efforts of cache line size on performance are shown in FIG. 18. Note that the situation here is quite different from that of matrix multiplication (compare with FIG. 13). As the line size changes, so does the performance of the Gaussian elimination algorithm. The line size L is also the blocking factor p of the algorithm. For small line sizes, the locality is not very strong resulting in lower cache benefit. For very large line sizes or blocking factors, on the other hand, there are more arithmetic operations, which implies that the unenhanced portion of the execution time is increased. As a result, speedup reduces according to Amdahl's law. The optimal cache line size or blocking factor is at about 64 words that gives a factor of 5.5 performance improvement. Notice, however, that a factor of 3 performance improvement is observed even with line size of one word as shown in the figure. In other words, the proposed cache organization can triple the vector performance even for level 1 BLAS subroutes as long as the column or row length is less than cache size which is 8K-1 in our discussion.

Figure 19:
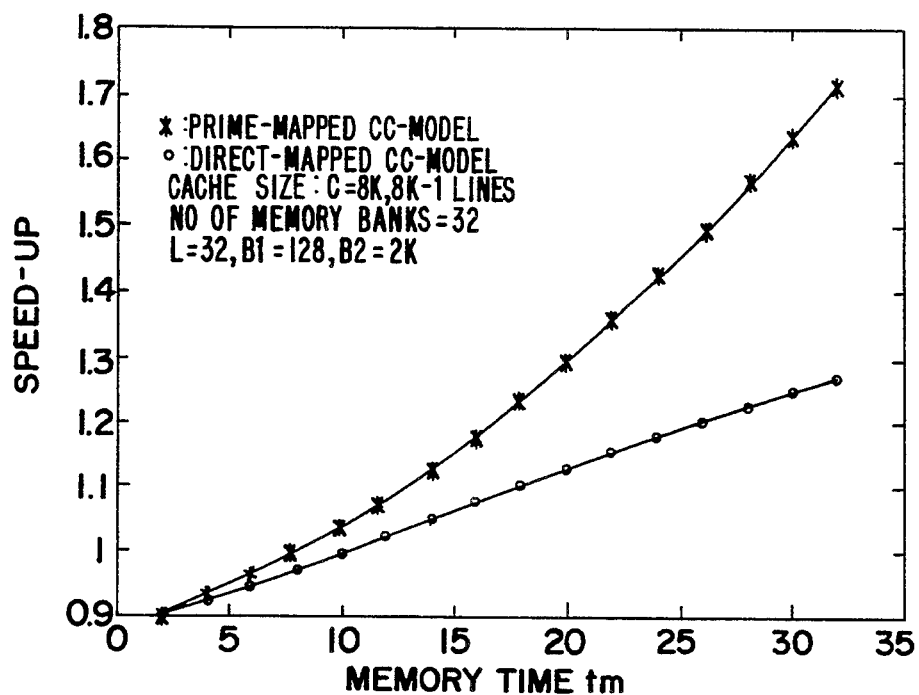
FIG. 19 shows a graph of vector speedup for an FFT algorithm vs. memory cycle time.

The performance for the FFT algorithm is shown in FIG. 19 as a function of memory cycle time. When memory access time is small (less than 6 cycles), adding cache memory does not improve vector performance. Notice that on the MM-model, all vector operations utilize the maximum vector register length ($V_L=64$) while on the CC-model vector operations for row FFTs only use half of the maximum register length (32 words). The latter result in more strips as compared to the former. This is why the CC-model does not perform better than the MM-model for small memory cycle time. When the memory cycle time becomes larger, the CC-model takes over. The performance improvement of both mapping schemes increases as the memory time increases. As shown in FIG. 19, the prime-mapped cache performs better than the direct-mapped cache. The maximum performance improvement observed for the parameters considered here is about 40%.

Figure 20:
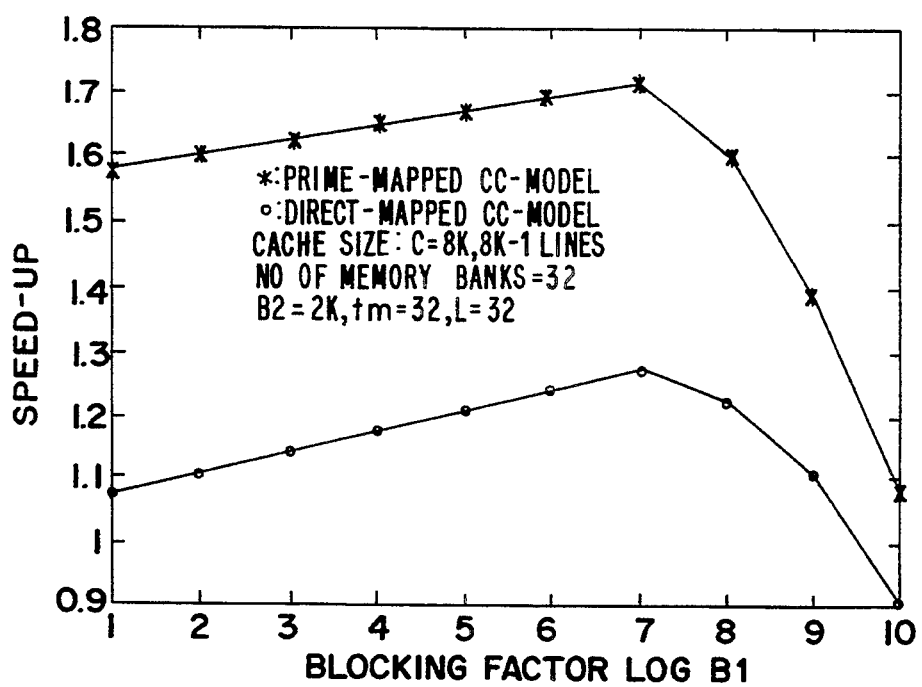
FIG. 20 shows a graph of vector speedup for an FFT algorithm vs. a blocking factor.

FIG. 20 shows how the performance changes with the change of blocking factor $B_1$. Initially, the speedup increases gradually with the increase of the blocking factor. However, when the blocking factor exceeds about 128, the speedup drops down. Recall that $B_1$ is the number of rows or the column length of the input data array. As the column length increases, the number of columns that can be placed in the cache is reduced for a given cache size. As a result, the vector length of each vector operation at the second step of the algorithm becomes small, implying more strips and more startup overheads. For $B_1$ being 1K, less than 8 columns can be placed in the cache and a vector strip contains only 8 elements as compared to 64 in the MM-model.

Notice that the FFT algorithm used in the analysis is a two dimensional, cache-optimized vector code. Many efforts have been made to optimize this algorithm. If $B_1$ is greater than the cache size, it is unknown whether the algorithm is still optimal. With the prime-mapped cache, the FFT algorithm can be implemented very easily by means of multi-dimensional FFT. The cache access is conflict free for all states of the transform. Optimization is guaranteed as long as the block size is less than the cache size.

I claim:

1. A cache memory system for use during vector processing in a processor, said processor having a central processing unit (CPU) and a main memory, said system comprising:

a vector cache memory;

a first address register which stores a first address associated with an instruction executed by said CPU;

main memory address calculation means coupled to said first address register for calculating a second address utilizing said first address and vector stride data associated with said executed instruction, said second address being utilized to access said main memory; and cache address calculation means coupled to both said first address register and said main memory address calculation unit for calculating a third address utilizing portions of said first address and portions of said second address, said third address being utilized to access said vector cache memory.

2. A system as claimed in claim 1, wherein said processor is a vector processor.

3. A system as claimed in claim 1, wherein said first address register includes a first tag field for identifying matching data in memory, a address field for storing a first, and an index field for accessing data in memory.

4. A system as claimed in claim 1, wherein said system further includes a second address register coupled to said main memory address calculation means which stores said second address.

5. A system as claimed in claim 1, wherein said system further includes a third address register coupled to said cache memory, wherein said third address register stores said third address.

6. A system as claimed in claim 4, wherein said second address register includes a second tag field for identifying matching data in said main memory, a second address field for storing a word address, and a second index field for accessing data in said main memory.

7. A system as claimed in claim 5, wherein said third address register includes a third tag field for identifying matching data in said cache memory, a third address field for storing a word address, and a third index field for accessing data in said cache memory.

8. A system as claimed in claim 1, wherein said cache address calculation means further includes an adder having a carry-out bit and a carry-in bit.

9. A system as claimed in claim 1, wherein the number of lines in said cache memory is a Mersenne prime number.

10. A system as claimed in claim 9, wherein each said cache line is a logical cache line.

11. A system as claimed in claim 1, wherein said cache includes $2^c-1$ cache lines such that $2^c-1$ is a prime number.

12. A system as claimed in claim 11, wherein each said cache line is a logical cache line and wherein the number of physical cache lines in $2^c$.

13. A method for addressing a vector cache memory during vector processing in a processor, said processor having a central processing unit (CPU) and a main memory, said method comprising the steps of:

1) storing a first address associated with an instruction executed by said CPU;
2) calculating a second address utilizing said first address and vector stride data associated with said executed instruction, said second address being utilized to access said main memory;
3) storing said second address;
4) calculating a third address utilizing portions of said first address and portions of said second address, said third address being utilized to access said vector cache memory; and
5) determining whether to utilize said second address to access said main memory or to utilize said third address to access said vector cache memory.

14. A method as claimed in claim 13, wherein said steps 2) and 4) are performed substantially simultaneously.

* * * * *